(12) United States Patent
Park et al.

(10) Patent No.: US 12,289,717 B2
(45) Date of Patent: Apr. 29, 2025

(54) METHOD FOR TRANSMITTING AND RECEIVING UPLINK SIGNAL IN WIRELESS COMMUNICATIONS SYSTEM, AND DEVICE THEREFOR

(71) Applicant: LG ELECTRONICS INC., Seoul (KR)

(72) Inventors: Jonghyun Park, Seoul (KR); Jiwon Kang, Seoul (KR); Haewook Park, Seoul (KR); Seongwon Go, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 546 days.

(21) Appl. No.: 17/634,926

(22) PCT Filed: Aug. 12, 2020

(86) PCT No.: PCT/KR2020/010659
§ 371 (c)(1),
(2) Date: Feb. 11, 2022

(87) PCT Pub. No.: WO2021/029660
PCT Pub. Date: Feb. 18, 2021

(65) Prior Publication Data
US 2022/0287020 A1    Sep. 8, 2022

(30) Foreign Application Priority Data

Aug. 13, 2019 (KR) .................... 10-2019-0099164

(51) Int. Cl.
*H04W 72/044* (2023.01)
*H04B 7/0404* (2017.01)

(52) U.S. Cl.
CPC ........ *H04W 72/046* (2013.01); *H04B 7/0404* (2013.01)

(58) Field of Classification Search
CPC .......... H04W 72/046; H04W 72/1268; H04W 72/21; H04W 72/02; H04W 72/04;
(Continued)

(56) References Cited

U.S. PATENT DOCUMENTS

2019/0141692 A1    5/2019   Subramanian et al.
2020/0107341 A1*   4/2020   Zhang ................... H04W 72/23
(Continued)

OTHER PUBLICATIONS

Lenovo et al., "Discussion of multi-beam operation" R1-1904573, 3GPP TSG RAN WG1 #96bis, Xi'an, China, Mar. 29, 2019, section 2.3.

(Continued)

*Primary Examiner* — Ricky Q Ngo
*Assistant Examiner* — David M Kayal
(74) *Attorney, Agent, or Firm* — BRYAN CAVE LEIGHTON PAISNER LLP

(57) ABSTRACT

A method for transmitting an uplink signal by means of a terminal in a wireless communication system, according to one embodiment of the present specification, comprises: receiving configuration information related to transmission of the uplink signal; receiving a message indicating an update of a panel related to the uplink signal; and transmitting the uplink signal on the basis of the configuration information and the message. On the basis of a specific panel being updated to a first panel through the message, the specific panel being configured in at least one specific uplink resource among uplink resources, a beam being configured in the at least one specific uplink resource is updated to a specific beam.

11 Claims, 20 Drawing Sheets

(58) Field of Classification Search
CPC ..... H04W 72/12; H04W 72/20; H04W 72/44; H04W 72/0446–0473; H04W 72/51–56; H04B 7/0404; H04B 7/0691; H04B 7/0695; H04B 7/088; Y02D 30/70
See application file for complete search history.

(56) References Cited

U.S. PATENT DOCUMENTS

| | | | |
|---|---|---|---|
| 2021/0153209 A1* | 5/2021 | Guan | H04L 5/0037 |
| 2021/0159966 A1* | 5/2021 | Xi | H04B 7/088 |
| 2022/0022215 A1* | 1/2022 | Gao | H04B 7/0874 |
| 2022/0060302 A1* | 2/2022 | Zhang | H04W 76/19 |
| 2024/0023183 A1* | 1/2024 | Deenoo | H04B 7/088 |

OTHER PUBLICATIONS

Lenovo et al., "Discussion of multi-beam operation" R1-1900387, 3GPP TSG RAN WG1 Ad-Hoc Meeting 1901, Taipei, Taiwan, Jan. 11, 2019, section 2.

CMCC "Enhancements on multi-beam operation" R1-1906522, 3GPP TSG RAN WG1 #97, Reno, NV USA, May 2, 2019, section 2.

Asustek, "Enhancements on multi-beam operation" R1-1901154, 3GPP TSG RAN WG1 Ad-Hoc Meeting 1901, Taipei, Taiwan, Jan. 11, 2019, section 2.1.

* cited by examiner

[FIG. 1]
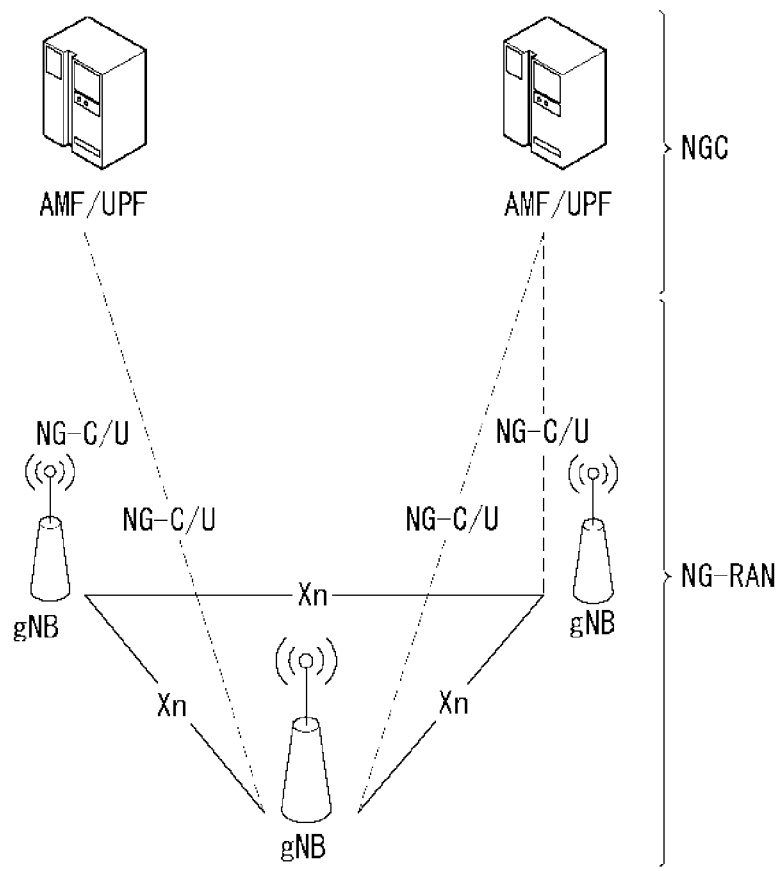
[FIG. 2]
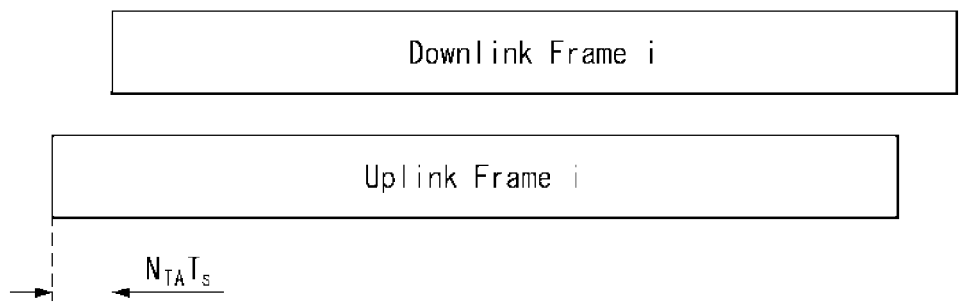

[FIG. 3]
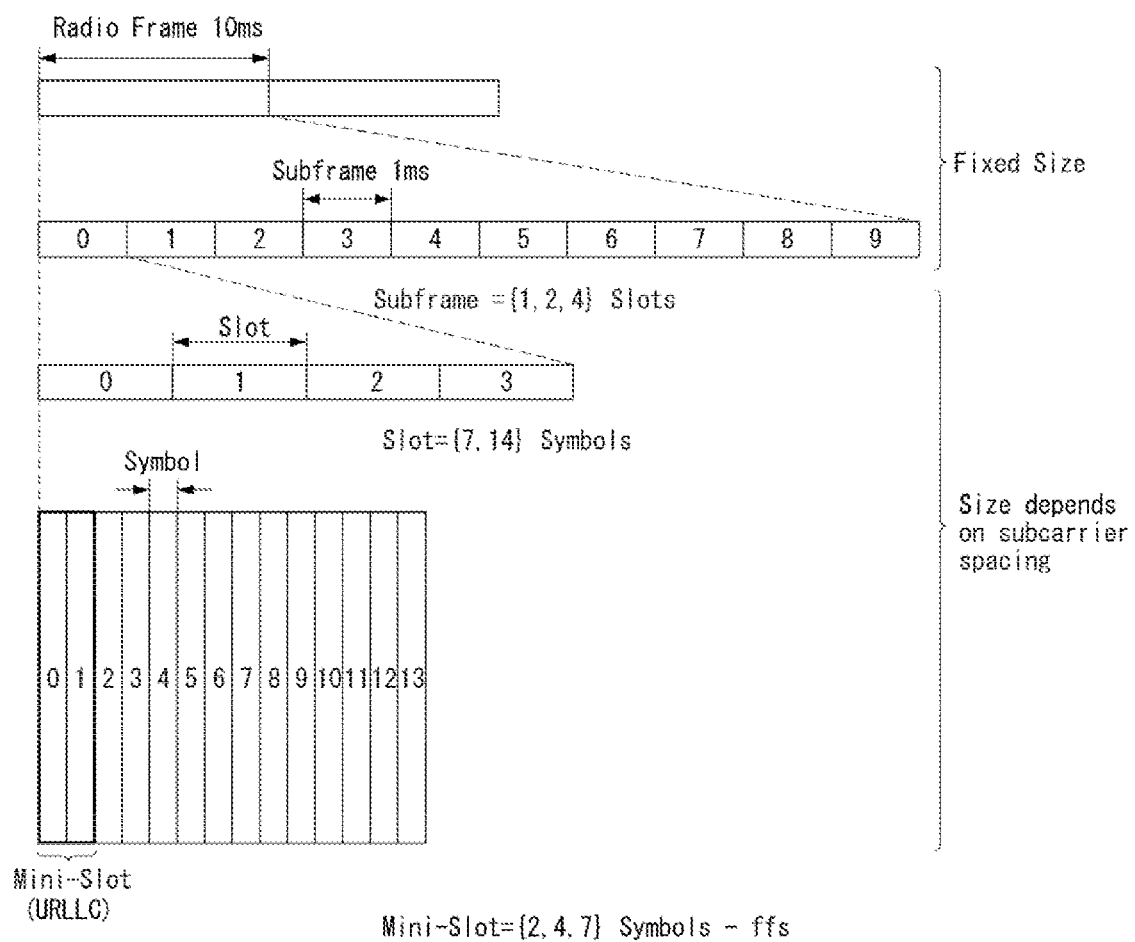

[FIG. 4]
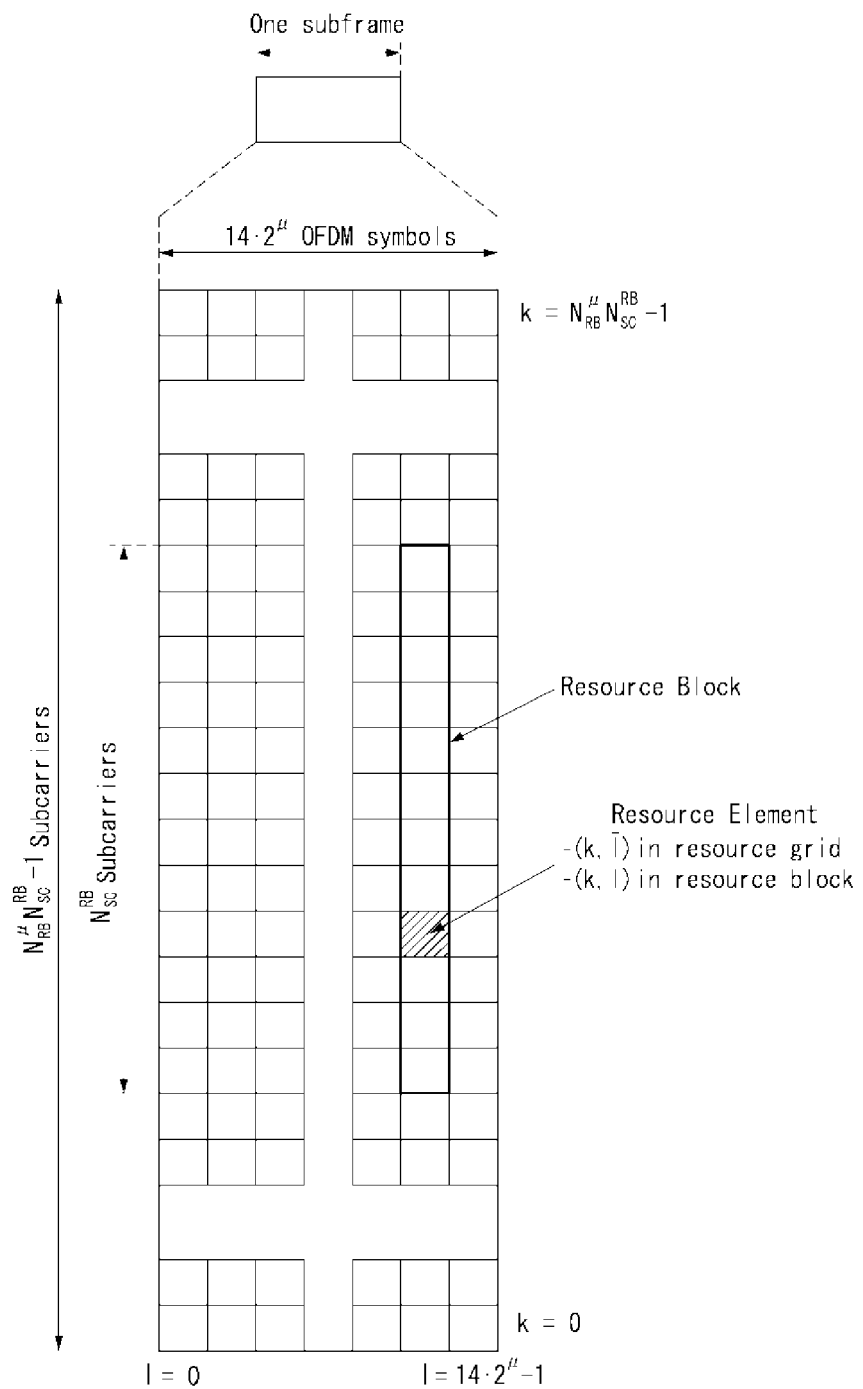

[FIG. 5]
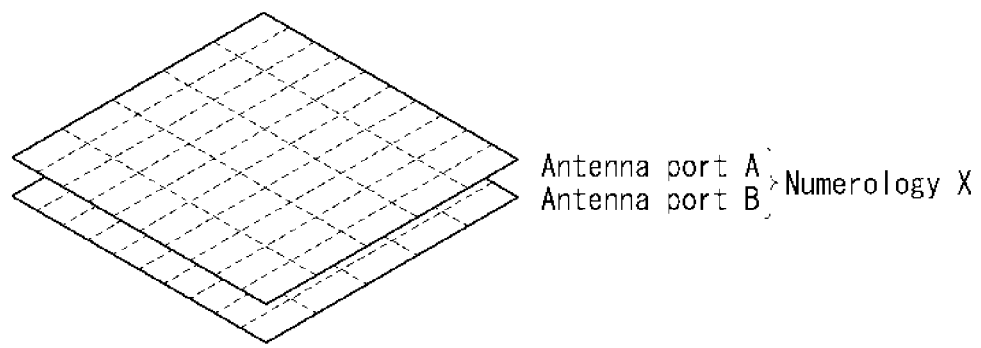
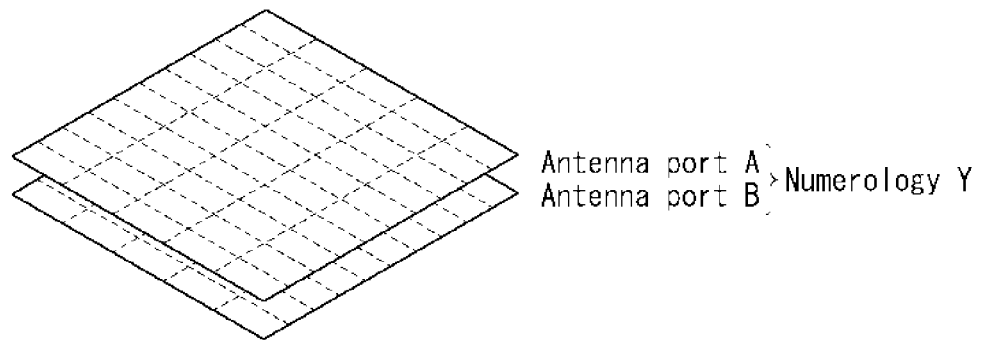

[FIG. 6]
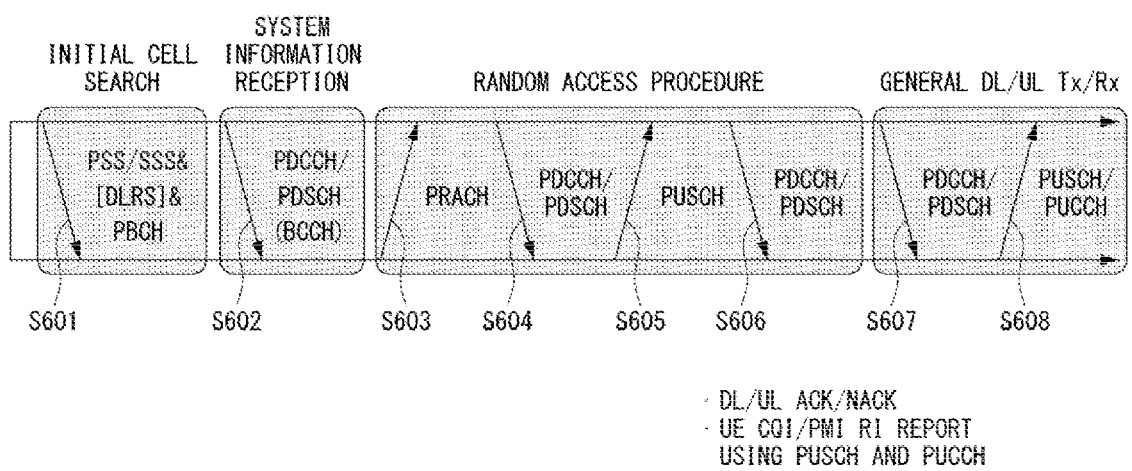

[FIG. 7]
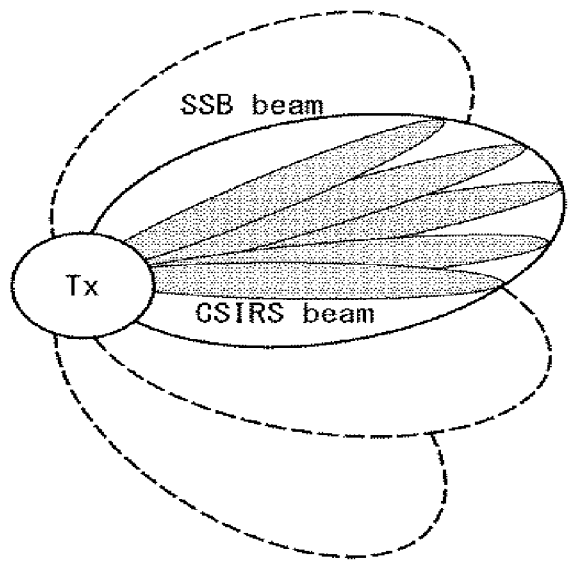
[FIG. 8]
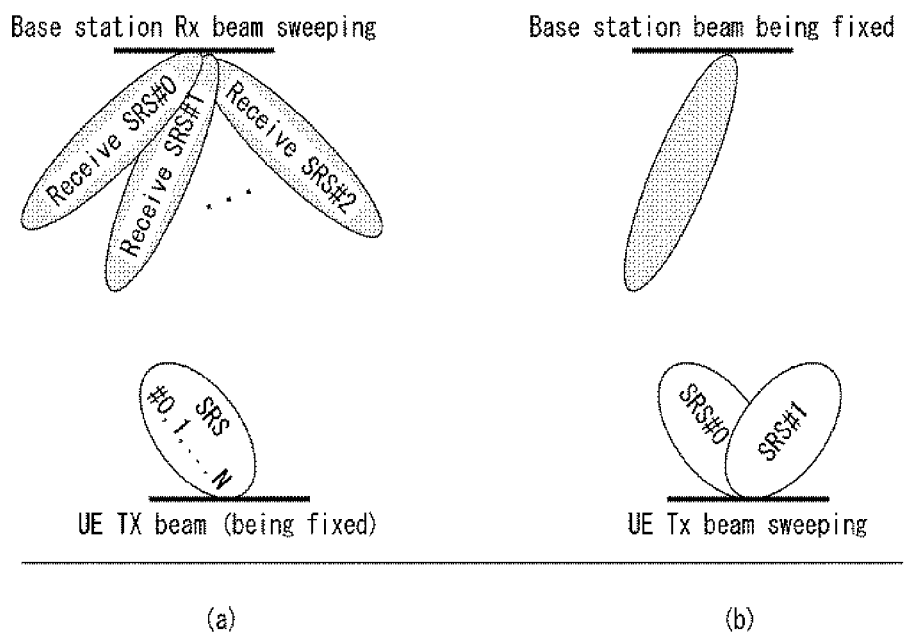

[FIG. 9]
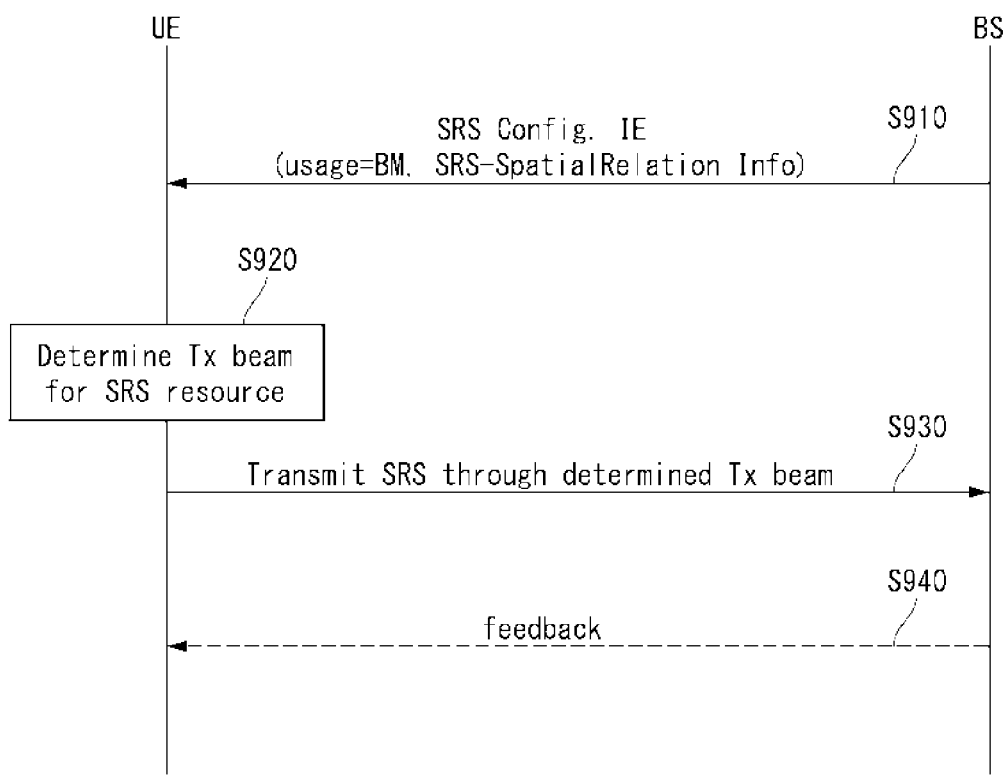

[FIG. 10]
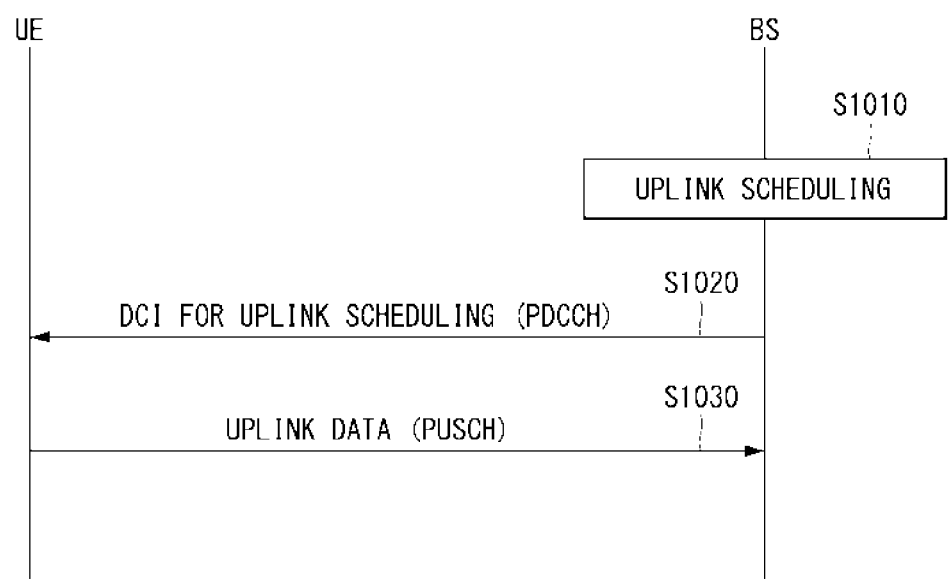

[FIG. 11]
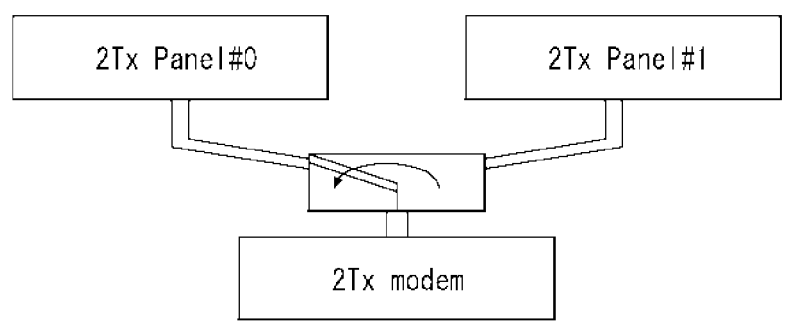

[FIG. 12]
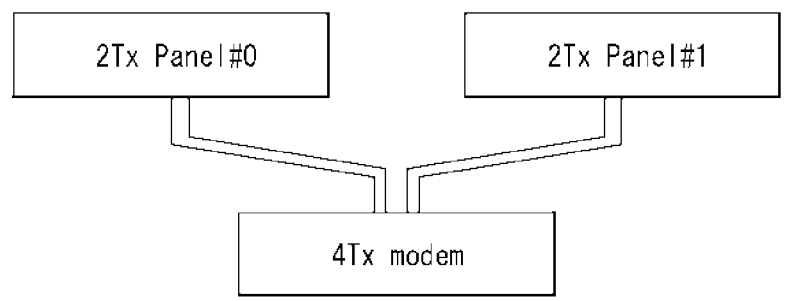

[FIG. 13]
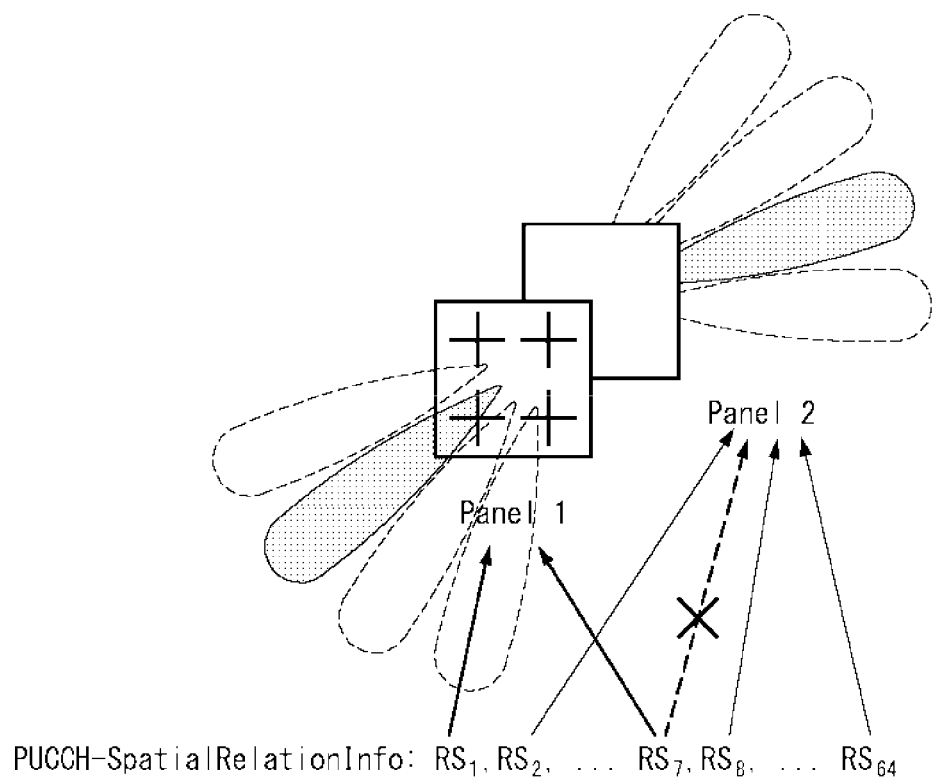

[FIG. 14]
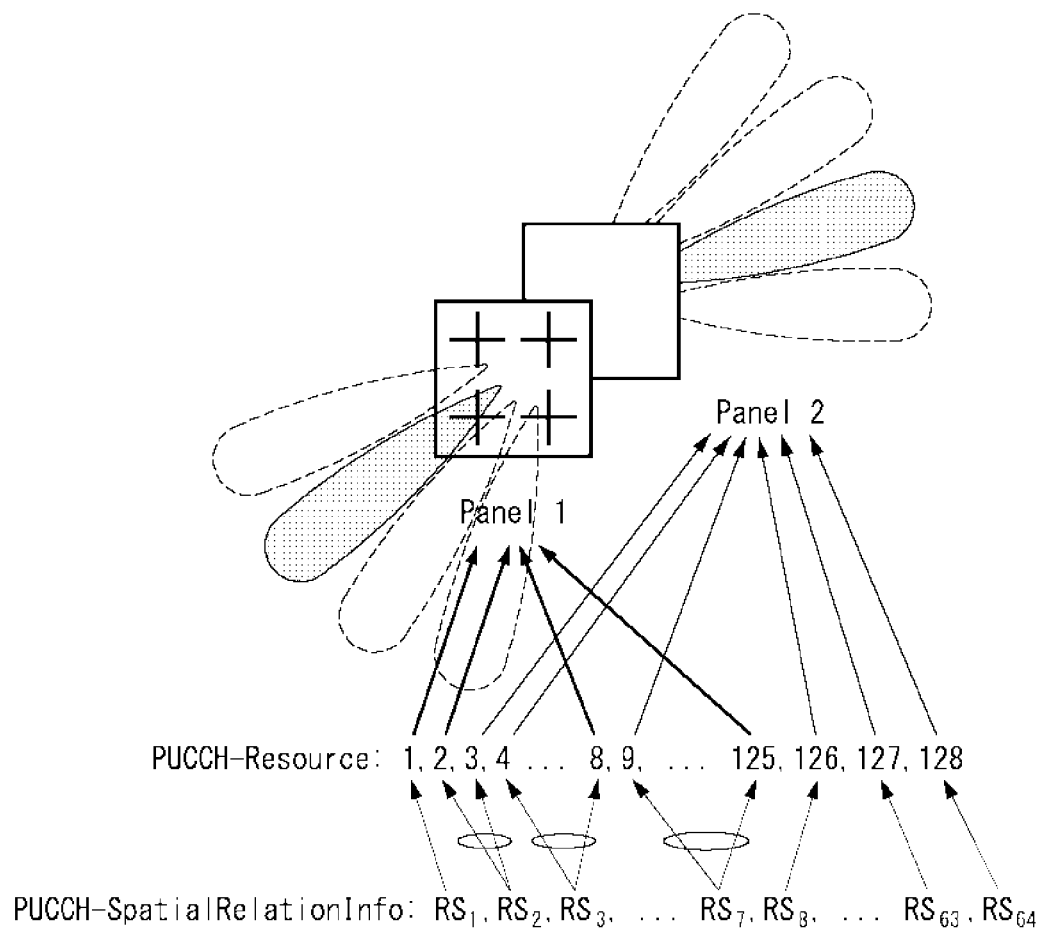

[FIG. 15]
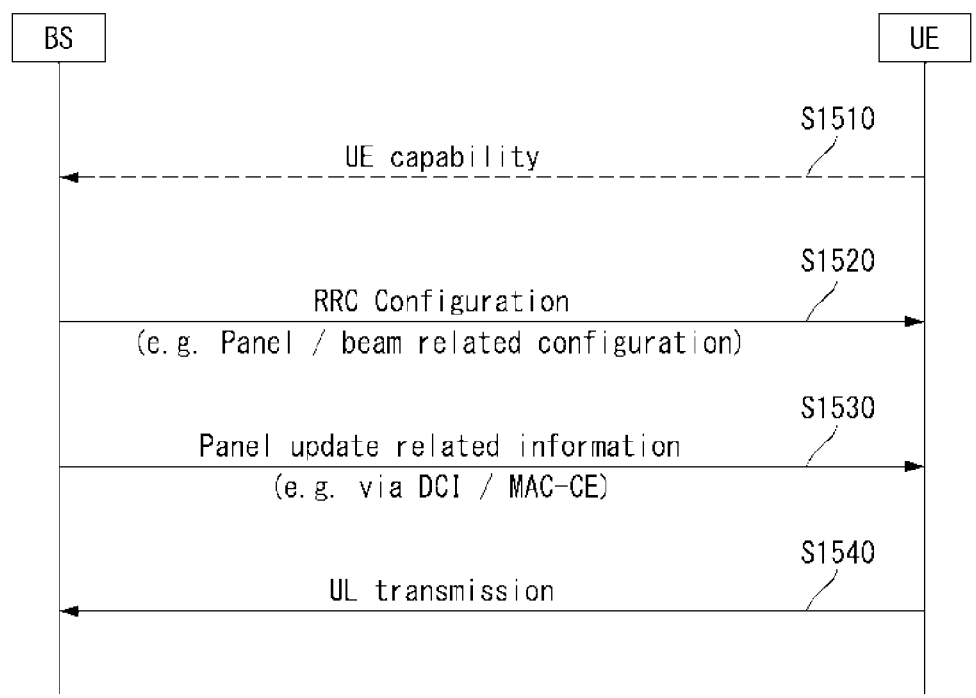

[FIG. 16]
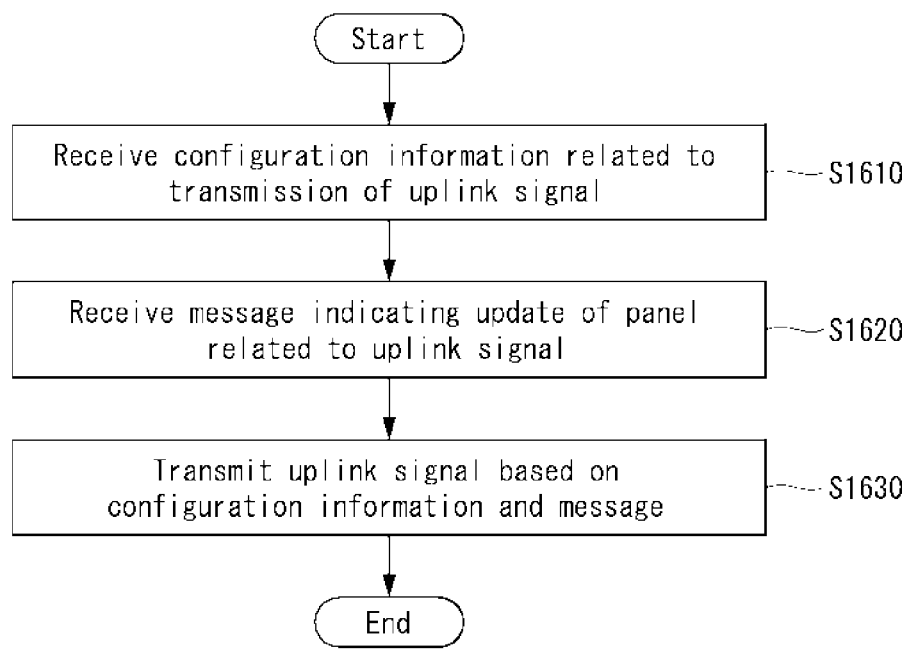

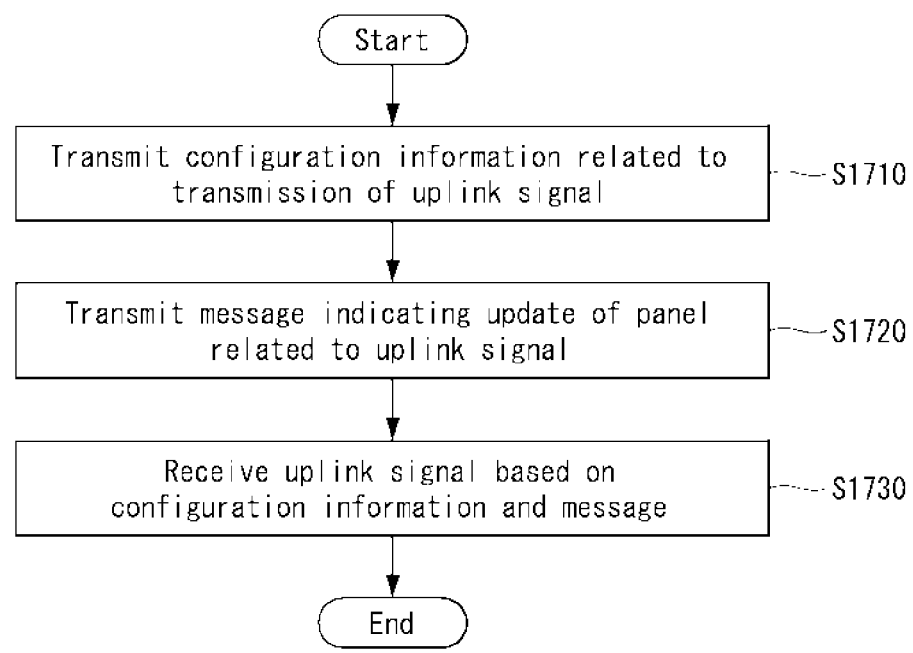
[FIG. 17]

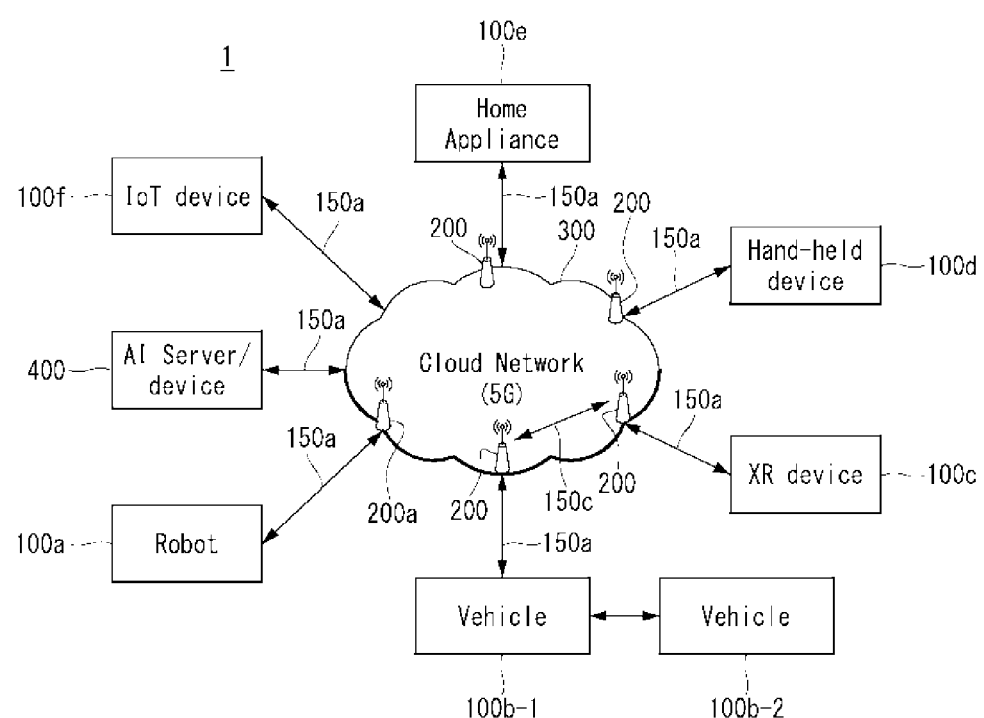
[FIG. 18]

[FIG. 19]
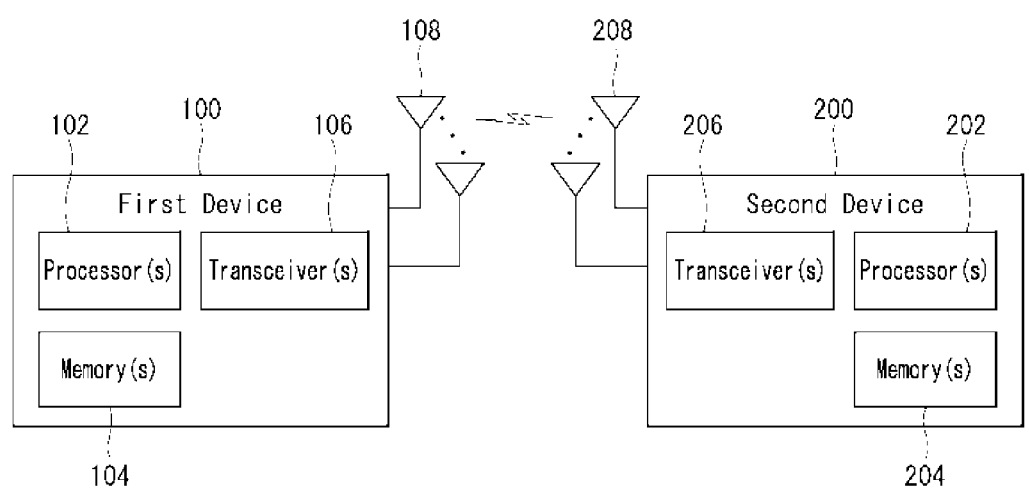

[FIG. 20]
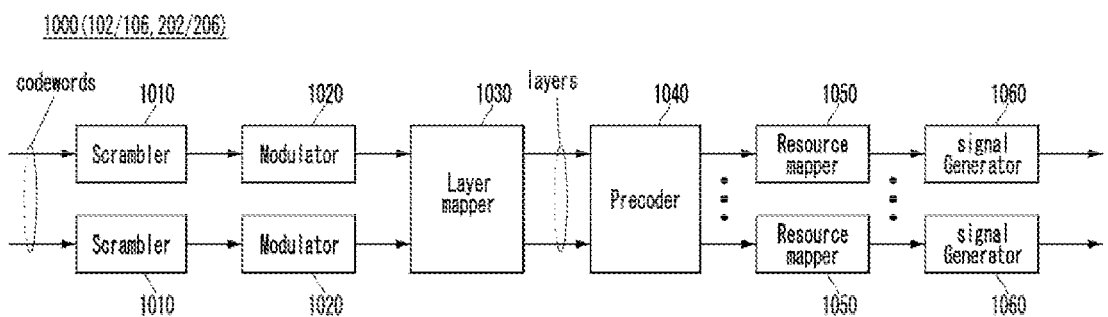

[FIG. 21]
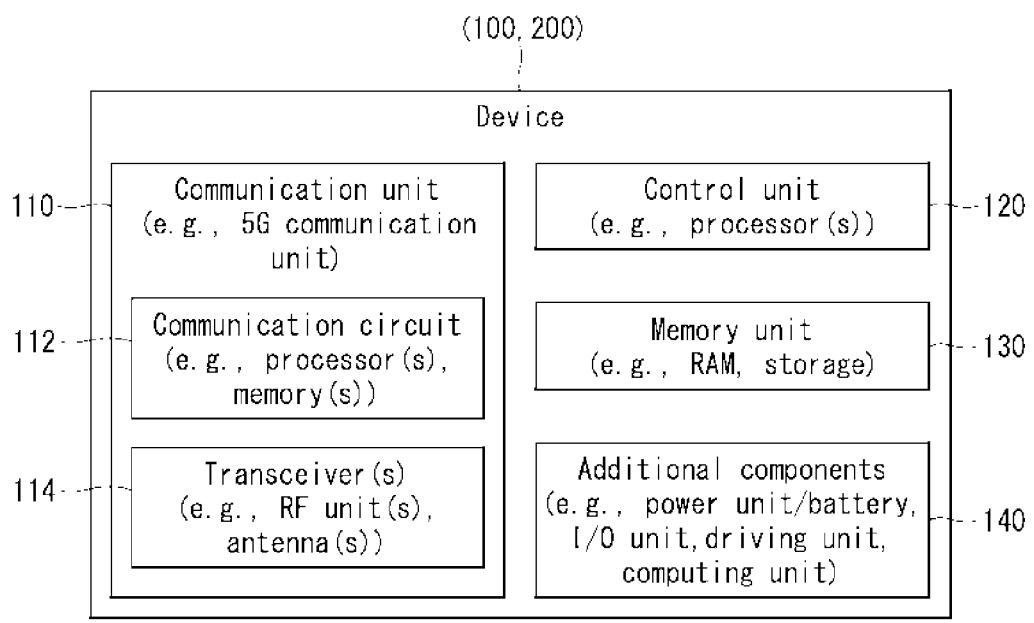

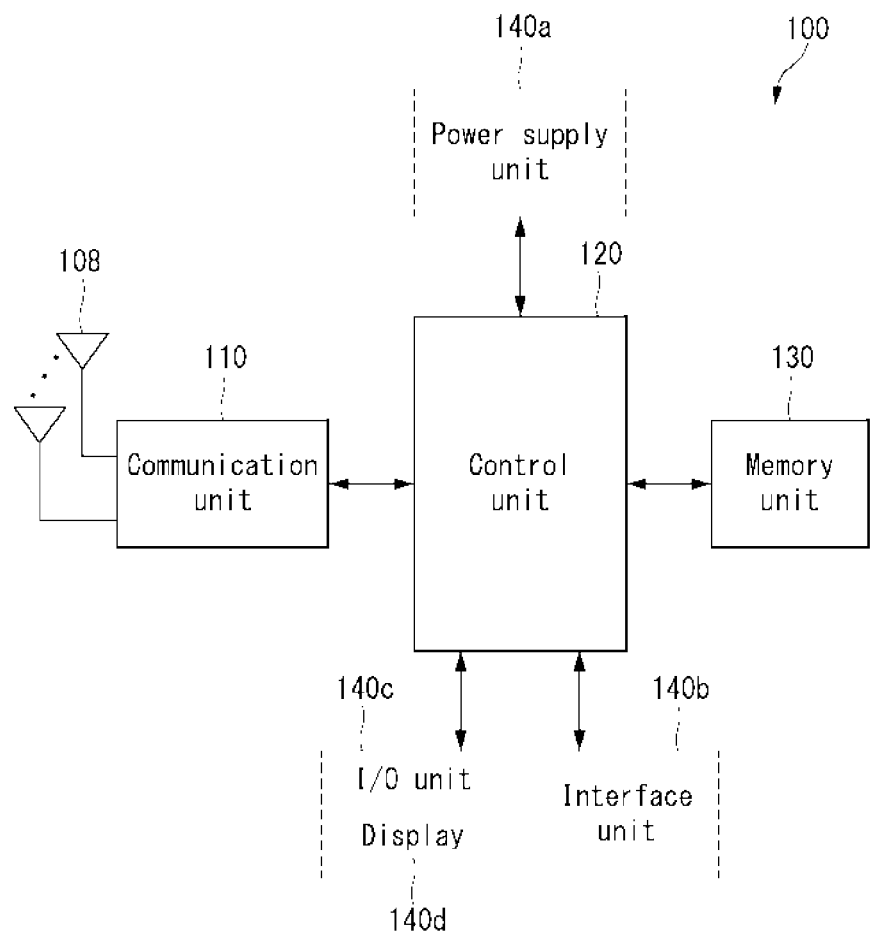

METHOD FOR TRANSMITTING AND RECEIVING UPLINK SIGNAL IN WIRELESS COMMUNICATIONS SYSTEM, AND DEVICE THEREFOR

CROSS-REFERENCE TO RELATED APPLICATIONS

This application is the National Stage filing under 35 U.S.C. 371 of International Application No. PCT/KR2020/010659, filed on Aug. 12, 2020, which claims the benefit of KR Application No. 10-2019-0099164, filed on Aug. 13, 2019, the contents of which are all hereby incorporated by reference herein in their entirety.

TECHNICAL FIELD

The present disclosure relates to a method for transmitting and receiving an uplink signal in a wireless communication system and device therefor.

BACKGROUND ART

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

DISCLOSURE

Technical Problem

The present disclosure proposes a method for transmitting an uplink signal.

Specifically, the present disclosure proposes a method for reducing signaling overhead related to the updating of panel/beam-related information, in the case where the configuration of panel-related information and beam-related information is independently performed in connection with transmission of an uplink signal.

The technical objects of the present disclosure are not limited to the aforementioned technical objects, and other technical objects, which are not mentioned above, will be apparently appreciated by a person having ordinary skill in the art from the following description.

Technical Solution

A method for transmitting an uplink signal by a user equipment (UE) in a wireless communication system according to one embodiment of the present disclosure includes: receiving configuration information related to transmission of the uplink signal; receiving a message indicating an update of a panel related to the uplink signal; and transmitting the uplink signal based on the configuration information and the message.

The configuration information is related to at least one of spatial relation information (Spatial-Relation Info) or an uplink transmission configuration indicator state (UL Transmission Configuration Indicator state, UL TCI state), and a beam related to transmission of the uplink signal is determined based on the configuration information. At least one panel related to transmission of the uplink signal among a plurality of panels of the UE is determined based on uplink resources through which the uplink signal is transmitted.

Based on a specific panel configured to at least one specific uplink resource among the uplink resources being updated to a first panel through the message, a beam configured in the at least one specific uplink resource is updated to a specific beam.

The specific beam may be based on a beam most configured in uplink resources related to the first panel among the uplink resources.

Based on two or more beams most configured in uplink resources related to the first panel, the specific beam may be a beam determined based on at least one specific rule among the two or more beams.

A beam determined based on the at least one specific rule may be based on a beam having a specific index.

The specific index may be related to an index of Spatial-Relation RS.

An update of the specific panel may be performed based on expiration of a preset timer.

The first panel may be based on a primary panel, and the remaining panels of the at least one panel other than the first panel may be based on a secondary panel.

Based on non-initiation of transmission of the uplink signal based on the secondary panel within a time according to a preset timer, a panel configured for uplink resources related to the secondary panel among the uplink resources may be updated to the primary panel.

At least one panel related to transmission of the uplink signal may be determined based on an uplink resource group, and the uplink resource group may include at least one uplink resource.

The message may be based on Downlink Control Information (DCI) or Medium Access Control-Control Element (MAC-CE).

A user equipment (UE) for transmitting an uplink signal in a wireless communication system according to another embodiment of the present disclosure includes: one or more transceivers; one or more processors for controlling the one or more transceivers; and one or more memories operatively connectable to the one or more processors and storing instructions for performing operations when transmission of the uplink signal is executed by the one or more processors.

The operations include receiving configuration information related to transmission of an uplink signal, receiving a message indicating an update of a panel related to the uplink signal, and transmitting the uplink signal based on the configuration information and the message.

The configuration information is related to at least one of spatial relationship information (Spatial-Relation Info) or an uplink transmission configuration indicator state (UL Transmission Configuration Indicator state, UL TCI state), and a beam related to transmission of the uplink signal is determined based on the configuration information. At least one panel related to transmission of the uplink signal among a plurality of panels of the UE is determined based on uplink resources through which the uplink signal is transmitted.

Based on a specific panel configured to at least one specific uplink resource among the uplink resources being updated to a first panel through the message, a beam configured in the at least one specific uplink resource is updated to a specific beam.

A device according to another embodiment of the present disclosure includes one or more memories and one or more processors functionally connected to the one or more memories.

The one or more processors are configured such that the device receives configuration information related to transmission of an uplink signal, receives a message indicating an update of a panel related to the uplink signal, and transmits the uplink signal based on the configuration information and the message.

The configuration information is related to at least one of spatial relationship information (Spatial-Relation Info) or an uplink transmission configuration indicator state (UL Transmission Configuration Indicator state, UL TCI state), and a beam related to transmission of the uplink signal is determined based on the configuration information. At least one panel related to transmission of the uplink signal among a plurality of panels of a user equipment (UE) is determined based on uplink resources through which the uplink signal is transmitted.

Based on a specific panel configured to at least one specific uplink resource among the uplink resources being updated to a first panel through the message, a beam configured in the at least one specific uplink resource is updated to a specific beam.

One or more non-transitory computer-readable media according to another embodiment of the present disclosure store one or more commands.

One or more commands executable by one or more processors are configured such that a user equipment (UE) receives configuration information related to transmission of an uplink signal, receives a message indicating an update of a panel related to the uplink signal, and transmits the uplink signal based on the configuration information and the message.

The configuration information is related to at least one of spatial relationship information (Spatial-Relation Info) or an uplink transmission configuration indicator state (UL Transmission Configuration Indicator state, UL TCI state), and a beam related to transmission of the uplink signal is determined based on the configuration information. At least one panel related to transmission of the uplink signal among a plurality of panels of the UE is determined based on uplink resources through which the uplink signal is transmitted.

Based on a specific panel configured to at least one specific uplink resource among the uplink resources being updated to a first panel through the message, a beam configured in the at least one specific uplink resource is updated to a specific beam.

A method for receiving an uplink signal by a base station in a wireless communication system according to another embodiment of the present disclosure includes: transmitting configuration information related to transmission of an uplink signal; transmitting a message indicating an update of a panel related to the uplink signal; and receiving the uplink signal based on the configuration information and the message.

The configuration information is related to at least one of spatial relationship information (Spatial-Relation Info) or an uplink transmission configuration indicator state (UL Transmission Configuration Indicator state, UL TCI state), and a beam related to transmission of the uplink signal is determined based on the configuration information. At least one panel related to transmission of the uplink signal among a plurality of panels of a user equipment (UE) is determined based on uplink resources through which the uplink signal is transmitted.

Based on a specific panel configured to at least one specific uplink resource among the uplink resources being updated to a first panel through the message, a beam configured in the at least one specific uplink resource is updated to a specific beam.

A base station for receiving an uplink signal in a wireless communication system according to another embodiment of the present disclosure includes: one or more transceivers; one or more processors for controlling the one or more transceivers; and one or more memories operatively connectable to the one or more processors and storing instructions for performing operations when reception of the uplink signal is executed by the one or more processors.

The operations include transmitting configuration information related to transmission of an uplink signal, transmitting a message indicating an update of a panel related to the uplink signal, and receiving the uplink signal based on the configuration information and the message.

The configuration information is related to at least one of spatial relationship information (Spatial-Relation Info) or an uplink transmission configuration indicator state (UL Transmission Configuration Indicator state, UL TCI state), and a beam related to transmission of the uplink signal is determined based on the configuration information. At least one panel related to transmission of the uplink signal among a plurality of panels of a user equipment (UE) is determined based on uplink resources through which the uplink signal is transmitted.

Based on a specific panel configured to at least one specific uplink resource among the uplink resources being updated to a first panel through the message, a beam configured in the at least one specific uplink resource is updated to a specific beam.

Advantageous Effects

According to one embodiment of the present disclosure, a panel related to transmission of an uplink signal is updated based on a message related to an update of the panel. Specifically, based on a specific panel configured to at least one specific uplink resource among the uplink resources being updated to a first panel through the message, a beam configured in the at least one specific uplink resource is updated to a specific beam. The specific beam may be based on a beam most configured in uplink resources related to the first panel among the uplink resources.

Based on a panel update, since the beams configured for all uplink resources associated therewith are updated together, signaling overhead can be reduced.

In addition, a UE panel may be adaptively controlled to a channel condition related to a panel. As a specific example, when a base station senses an environment in which the expected signal quality from the specific panel is deteriorated, the specific panel may be excluded from a configuration related to uplink transmission of a UE by transmitting the message. In other words, it is possible to obtain the same effect as substantially deactivating the corresponding panel through the message transmission.

In addition, the aforementioned operation can effectively support a system in which the panel and the beam of a UE are each independently controlled, in such a way that a panel for UL transmission of a multi-panel UE is determined by a UL resource group, and a beam for UL transmission is determined by a UL TCI state.

Effects which may be obtained by the present disclosure are not limited to the aforementioned effects, and other technical effects not described above may be evidently understood by a person having ordinary skill in the art to which the present disclosure pertains from the following description.

DESCRIPTION OF DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 1 is a diagram illustrating an example of an overall system structure of NR to which a method proposed in the present disclosure is applicable.

FIG. 2 illustrates a relationship between an uplink frame and a downlink frame in a wireless communication system to which a method proposed by the present disclosure is applicable.

FIG. 3 illustrates an example of a frame structure in an NR system.

FIG. 4 illustrates an example of a resource grid supported by a wireless communication system to which a method proposed in the present disclosure is applicable.

FIG. 5 illustrates examples of a resource grid for each antenna port and numerology to which a method proposed in the present disclosure is applicable.

FIG. 6 illustrates physical channels and general signal transmission used in a 3GPP system.

FIG. 7 illustrates an example of beamforming using SSB and CSI-RS.

FIG. 8 illustrates an example of a UL BM procedure using an SRS.

FIG. 9 is a flowchart showing an example of a UL BM procedure using the SRS.

FIG. 10 is a flowchart showing an example of an uplink transmission/reception operation to which a method proposed in the present disclosure may be applied.

FIGS. 11 and FIG. 12 illustrate an example of multi-panel based on an RF switch applied to the disclosure.

FIG. 13 is a diagram showing an example of association between a panel and a reference signal proposed in the present disclosure.

FIG. 14 is a diagram showing another example of association between a panel and a reference signal proposed in the present disclosure.

FIG. 15 shows an example of signaling between a UE and a base station to which a method proposed in the present disclosure can be applied.

FIG. 16 is a flowchart illustrating a method for transmitting an uplink signal by a UE in a wireless communication system according to an embodiment of the present disclosure.

FIG. 17 is a flowchart illustrating a method for receiving an uplink signal by a base station in a wireless communication system according to another embodiment of the present disclosure.

FIG. 18 illustrates a communication system 1 applied to the present disclosure.

FIG. 19 illustrates wireless devices applicable to the present disclosure.

FIG. 20 illustrates a signal process circuit for a transmission signal.

FIG. 21 illustrates another example of a wireless device applied to the present disclosure.

FIG. 22 illustrates a hand-held device applied to the present disclosure.

MODE FOR DISCLOSURE

Hereinafter, preferred embodiments of the disclosure are described in detail with reference to the accompanying drawings. The following detailed description taken in conjunction with the accompanying drawings is intended for describing example embodiments of the disclosure, but not for representing a sole embodiment of the disclosure. The detailed description below includes specific details to convey a thorough understanding of the disclosure. However, it will be easily appreciated by one of ordinary skill in the art that embodiments of the disclosure may be practiced even without such details.

In some cases, to avoid ambiguity in concept, known structures or devices may be omitted or be shown in block diagrams while focusing on core features of each structure and device.

Hereinafter, downlink (DL) means communication from a base station to a UE and uplink (UL) means communication from the UE to the base station. In the downlink, a transmitter may be part of the base station, and a receiver may be part of the UE. In the uplink, the transmitter may be part of the UE and the receiver may be part of the base station. The base station may be expressed as a first communication device and the UE may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the UE may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11 (Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

For clarity of description, the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. The LTE/NR may be collectively referred to as the 3GPP system. Matters disclosed in a standard document published before the present disclosure may refer to a background art, terms, abbreviations, etc., used for describing the present disclosure. For example, the following documents may be referenced.

3GPP LTE
36.211: Physical channels and modulation
36.212: Multiplexing and channel coding
36.213: Physical layer procedures
36.300: Overall description
36.331: Radio Resource Control (RRC)
3GPP NR
38.211: Physical channels and modulation
38.212: Multiplexing and channel coding
38.213: Physical layer procedures for control
38.214: Physical layer procedures for data
38.300: NR and NG-RAN Overall Description
36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. As such, the introduction of next-generation radio access technology considering enhanced mobile broadband communication (eMBB), massive MTC (mMTC), ultra-reliable and low latency communication (URLLC) is discussed, and in the present disclosure, the technology is called NR for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a New RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. By scaling a reference subcarrier spacing by an integer N, different numerologies can be defined.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used at an NG2 reference point between new RAN and NGC.

NG-U: A user plane interface used at an NG3 reference point between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: An end point of NG-U interface.

Overview of System

FIG. 1 illustrates an example overall NR system structure to which a method as proposed in the disclosure may apply.

Referring to FIG. 1, an NG-RAN is constituted of gNBs to provide a control plane (RRC) protocol end for user equipment (UE) and NG-RA user plane (new AS sublayer/PDCP/RLC/MAC/PHY).

The gNBs are mutually connected via an Xn interface.

The gNBs are connected to the NGC via the NG interface.

More specifically, the gNB connects to the access and mobility management function (AMF) via the Na2 interface and connects to the user plane function (UPF) via the N3 interface.

New RAT (NR) Numerology and Frame Structure

In the NR system, a number of numerologies may be supported. Here, the numerology may be defined by the subcarrier spacing and cyclic prefix (CP) overhead. At this time, multiple subcarrier spacings may be derived by scaling the basic subcarrier spacing by integer N (or, μ). Further, although it is assumed that a very low subcarrier spacing is not used at a very high carrier frequency, the numerology used may be selected independently from the frequency band.

Further, in the NR system, various frame structures according to multiple numerologies may be supported.

Hereinafter, an orthogonal frequency division multiplexing (OFDM) numerology and frame structure that may be considered in the NR system is described.

The multiple OFDM numerologies supported in the NR system may be defined as shown in Table 1.

TABLE 1

| μ | Δf = $2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

NR supports multiple numerologies (or subcarrier spacings (SCS)) for supporting various 5G services. For example, if SCS is 15 kHz, NR supports a wide area in typical cellular bands. If SCS is 30 kHz/60 kHz, NR supports a dense urban, lower latency and a wider carrier bandwidth. If SCS is 60 kHz or higher, NR supports a bandwidth greater than 24.25 GHz in order to overcome phase noise.

An NR frequency band is defined as a frequency range of two types FR1 and FR2. The FR1 and the FR2 may be configured as in Table 1 below. Furthermore, the FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

With regard to the frame structure in the NR system, the size of various fields in the time domain is expressed as a multiple of time unit of $T_s = 1/(\Delta f_{max} \cdot N_f)$, where $\Delta f_{max} = 480 \cdot 10^3$, and $N_f = 4096$. Downlink and uplink transmissions is constituted of a radio frame with a period of $T_f = (\Delta f_{max} N_f / 100) \ T_s = 10$ ms. Here, the radio frame is constituted of 10 subframes each of which has a period of $T_{sf} = (\Delta f_{max} N_f / 1000) \cdot T_s = 1$ ms. In this case, one set of frames for uplink and one set of frames for downlink may exist.

FIG. 2 illustrates a relationship between an uplink frame and downlink frame in a wireless communication system to which a method described in the present disclosure is applicable.

As illustrated in FIG. 2, uplink frame number i for transmission from the user equipment (UE) should begin $T_{TA} = N_{TA} T_s$ earlier than the start of the downlink frame by the UE.

For numerology μ, slots are numbered in ascending order of $n_s^\mu \in \{0, \ldots, N_{subframe}^{slots,\mu} - 1\}$ in the subframe and in ascending order of $n_{s,f}^\mu \in \{0, \ldots, N_{frame}^{slots,\mu} - 1\}$ in the radio frame. One slot includes consecutive OFDM symbols of $N_{symb}^\mu$, and $N_{symb}^\mu$ is determined according to the used numerology and slot configuration. In the subframe, the start of slot $n_s^\mu$ is temporally aligned with the start of $n_s^\mu N_{symb}^\mu$.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slots}^{frame,\mu}$ of slots per radio frame, and the number $M_{slot}^{subframe,\mu}$ of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame, \mu}$ | $N_{slot}^{subframe, \mu}$ |
|---|---|---|---|
| 2 | 12 | 40 | 4 |

FIG. 3 illustrates an example of a frame structure in a NR system. FIG. 3 is merely for convenience of explanation and does not limit the scope of the present disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. may be considered.

Hereinafter, the above physical resources that can be considered in the NR system are described in more detail.

First, in regard to an antenna port, the antenna port is defined so that a channel over which a symbol on an antenna port is conveyed can be inferred from a channel over which another symbol on the same antenna port is conveyed. When large-scale properties of a channel over which a symbol on one antenna port is conveyed can be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $N_{RB}^\mu N_{sc}^{RB}$ subcarriers on a frequency domain, each subframe consisting of 14·2μ OFDM symbols, but the present disclosure is not limited thereto.

In the NR system, a transmitted signal is described by one or more resource grids, consisting of $N_{RB}^\mu N_{sc}^{RB}$ subcarriers, and $2^\mu N_{symb}^{(\mu)}$ OFDM symbols, where $N_{RB}^\mu \leq N_{RB}^{max,\mu}$. $N_{RB}^{max,\mu}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the present disclosure is applicable.

Each element of the resource grid for the numerology μ and the antenna port p is called a resource element and is uniquely identified by an index pair (k, l̄), where k=0, . . . , $N_{RB}^\mu N_{sc}^{RB} - 1$ is an index on a frequency domain, and l̄=0, . . . , $2^\mu N_{symb}^{(\mu)} - 1$ refers to a location of a symbol in a subframe. The index pair (k,I) is used to refer to a resource element in a slot, where $l=0, \ldots, N_{symb}^\mu-1$.

The resource element (k,I) for the numerology μ and the antenna port p corresponds to a complex value $a_{k,l}^{(p,\mu)}$. When there is no risk for confusion or when a specific antenna port or numerology is not specified, the indexes p and μ may be dropped, and as a result, the complex value may be $a_{k,l}^{(p)}$ or $a_{k,l}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2.

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^\mu$ in the frequency domain and resource elements (k, l) for the subcarrier spacing configuration μ may be given by the following Equation 1.

$$n_{CRB}^\mu = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. of the BWP. A relation between the physical resource block $n_{PRB}$ in BWP i and the common resource block $n_{CRB}$ may be given by the following Equation 2.

$$n_{CRB}=n_{PRB}+N_{BWP,i}^{start} \quad \text{[Equation 2]}$$

Here, $N_{BWP,i}^{start}$ may be the common resource block where the BWP starts relative to the common resource block 0.

Physical Channel and General Signal Transmission

FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (COI), a Precoding Matrix Index (PMI), a Rank Indicator (RI), and the like. The UE may transmit the control information such as the CQI/PMI/RI, etc., through the PUSCH and/or PUCCH.

Beam Management (BM)

A BM procedure as layer 1 (L1)/layer 2 (L2) procedures for acquiring and maintaining a set of base station (e.g., gNB, TRP, etc.) and/or terminal (e.g., UE) beams which may be used for downlink (DL) and uplink (UL) transmission/reception may include the following procedures and terms.

Beam measurement: Operation of measuring characteristics of a beam forming signal received by the eNB or UE.

Beam determination: Operation of selecting a transmit (Tx) beam/receive (Rx) beam of the eNB or UE by the eNB or UE.

Beam sweeping: Operation of covering a spatial region using the transmit and/or receive beam for a time interval by a predetermined scheme.

Beam report: Operation in which the UE reports information of a beamformed signal based on beam measurement.

The BM procedure may be divided into (1) a DL BM procedure using a synchronization signal (SS)/physical broadcast channel (PBCH) Block or CSI-RS and (2) a UL BM procedure using a sounding reference signal (SRS). Further, each BM procedure may include Tx beam sweeping for determining the Tx beam and Rx beam sweeping for determining the Rx beam.

Downlink Beam Management (DL BM)

The DL BM procedure may include (1) transmission of beamformed DL reference signals (RSs) (e.g., CIS-RS or SS Block (SSB)) of the eNB and (2) beam reporting of the UE.

Here, the beam reporting a preferred DL RS identifier (ID)(s) and L1-Reference Signal Received Power (RSRP).

The DL RS ID may be an SSB Resource Indicator (SSBRI) or a CSI-RS Resource Indicator (CRI).

FIG. 7 illustrates an example of beamforming using a SSB and a CSI-RS.

As illustrated in FIG. 7, a SSB beam and a CSI-RS beam may be used for beam measurement. A measurement metric is L1-RSRP per resource/block. The SSB may be used for coarse beam measurement, and the CSI-RS may be used for fine beam measurement. The SSB may be used for both Tx beam sweeping and Rx beam sweeping. The Rx beam sweeping using the SSB may be performed while the UE changes Rx beam for the same SSBRI across multiple SSB bursts. One SS burst includes one or more SSBs, and one SS burst set includes one or more SSB bursts.

DL BM Related Beam Indication

A UE may be RRC-configured with a list of up to M candidate transmission configuration indication (TCI) states at least for the purpose of quasi co-location (QCL) indication, where M may be 64.

Each TCI state may be configured with one RS set. Each ID of DL RS at least for the purpose of spatial QCL (QCL Type D) in an RS set may refer to one of DL RS types such as SSB, P-CSI RS, SP-CSI RS, A-CSI RS, etc.

Initialization/update of the ID of DL RS(s) in the RS set used at least for the purpose of spatial QCL may be performed at least via explicit signaling.

Table 5 represents an example of TCI-State IE.

The TCI-State IE associates one or two DL reference signals (RSs) with corresponding quasi co-location (QCL) types.

TABLE 5

```
-- ASN1START
-- TAG-TCI-STATE-START
TCI-State ::=           SEQUENCE {
   tci-StateId             TCI-StateId,
   qcl-Type1               QCL-Info,
   qcl-Type2               QCL-Info
   ...
}
QCL-Info ::=            SEQUENCE {
   cell                    ServCellIndex
   bwp-Id                  BWP-Id
   referenceSignal         CHOICE {
      csi-rs                  NZP-CSI-RS-ResourceId,
      ssb                     SSB-Index
   },
   qcl-Type                ENUMERATED {typeA, typeB, typeC, typeD},
   ...
}
-- TAG-TCI-STATE-STOP
-- ASN1STOP
```

In Table 5, bwp-Id parameter represents a DL BWP where the RS is located, cell parameter represents a carrier where the RS is located, and reference signal parameter represents reference antenna port(s) which is a source of quasi co-location for corresponding target antenna port(s) or a reference signal including the one. The target antenna port(s) may be CSI-RS, PDCCH DMRS, or PDSCH DMRS. As an example, in order to indicate QCL reference RS information on NZP CSI-RS, the corresponding TCI state ID may be indicated to NZP CSI-RS resource configuration information. As another example, in order to indicate QCL reference information on PDCCH DMRS antenna port(s), the TCI state ID may be indicated to each CORESET configuration. As another example, in order to indicate QCL reference information on PDSCH DMRS antenna port(s), the TCI state ID may be indicated via DCI.

Quasi-Co Location (QCL)

The antenna port is defined so that a channel over which a symbol on an antenna port is conveyed can be inferred from a channel over which another symbol on the same antenna port is conveyed. When properties of a channel over which a symbol on one antenna port is conveyed can be inferred from a channel over which a symbol on another antenna port is conveyed, the two antenna ports may be considered as being in a quasi co-located or quasi co-location (QC/QCL) relationship.

The channel properties include one or more of delay spread, Doppler spread, frequency/Doppler shift, average received power, received timing/average delay, and spatial RX parameter. The spatial Rx parameter means a spatial (reception) channel property parameter such as an angle of arrival.

The UE may be configured with a list of up to M TCI-State configurations within the higher layer parameter PDSCH-Config to decode PDSCH according to a detected PDCCH with DCI intended for the corresponding UE and a given serving cell, where M depends on UE capability.

Each TCI-State contains parameters for configuring a quasi co-location relationship between one or two DL reference signals and the DM-RS ports of the PDSCH.

The quasi co-location relationship is configured by the higher layer parameter qcl-Type1 for the first DL RS and qcl-Type2 for the second DL RS (if configured). For the case of two DL RSs, the QCL types are not be the same, regardless of whether the references are to the same DL RS or different DL RSs.

The quasi co-location types corresponding to each DL RS are given by the higher layer parameter qcl-Type of QCL-Info and may take one of the following values:
  'QCL-TypeA': {Doppler shift, Doppler spread, average delay, delay spread}
  'QCL-TypeB': {Doppler shift, Doppler spread}
  'QCL-TypeC': {Doppler shift, average delay}
  'QCL-TypeD': {Spatial Rx parameter}

For example, if a target antenna port is a specific NZP CSI-RS, the corresponding NZP CSI-RS antenna ports may be indicated/configured to be QCLed with a specific TRS in terms of QCL-TypeA and with a specific SSB in terms of QCL-TypeD. The UE receiving the indication/configuration may receive the corresponding NZP CSI-RS using the Doppler or delay value measured in the QCL-TypeA TRS and apply the Rx beam used for QCL-TypeD SSB reception to the reception of the corresponding NZP CSI-RS reception.

The UE may receive an activation command by MAC CE signaling used to map up to eight TCI states to the codepoint of the DCI field 'Transmission Configuration Indication'.

UL BM Procedure

A UL BM may be configured such that beam reciprocity (or beam correspondence) between Tx beam and Rx beam is established or not established depending on the UE implementation. If the beam reciprocity between Tx beam and Rx beam is established in both a base station and a UE, a UL beam pair may be adjusted via a DL beam pair. However, if the beam reciprocity between Tx beam and Rx beam is not established in any one of the base station and the UE, a process for determining the UL beam pair is necessary separately from determining the DL beam pair.

Even when both the base station and the UE maintain the beam correspondence, the base station may use a UL BM procedure for determining the DL Tx beam even if the UE does not request a report of a (preferred) beam.

The UM BM may be performed via beamformed UL SRS transmission, and whether to apply UL BM of a SRS resource set is configured by the (higher layer parameter) usage. If the usage is set to 'BeamManagement (BM)', only one SRS resource may be transmitted to each of a plurality of SRS resource sets in a given time instant.

The UE may be configured with one or more sounding reference symbol (SRS) resource sets configured by (higher layer parameter) SRS-ResourceSet (via higher layer signaling, RRC signaling, etc.). For each SRS resource set, the UE may be configured with K≥1 SRS resources (higher later parameter SRS-resource), where K is a natural number, and a maximum value of K is indicated by SRS_capability.

In the same manner as the DL BM, the UL BM procedure may be divided into a UE's Tx beam sweeping and a base station's Rx beam sweeping.

FIG. 8 illustrates an example of an UL BM procedure using a SRS.

More specifically, (a) of FIG. 8 illustrates an Rx beam determination procedure of a base station, and (a) of FIG. 8 illustrates a Tx beam sweeping procedure of a UE.

FIG. 9 is a flow chart illustrating an example of an UL BM procedure using a SRS.

The UE receives, from the base station, RRC signaling (e.g., SRS-Config IE) including (higher layer parameter) usage parameter set to 'beam management' in S910.

Table 6 represents an example of SRS-Config information element (IE), and the SRS-Config IE is used for SRS transmission configuration. The SRS-Config IE contains a list of SRS-Resources and a list of SRS-Resource sets. Each SRS resource set means a set of SRS resources.

The network may trigger transmission of the SRS resource set using configured aperiodicSRS-ResourceTrigger (L1 DCI).

TABLE 6

```
-- ASN1START
-- TAG-MAC-CELL-GROUP-CONFIG-START
SRS-Config ::=                              SEQUENCE {
    src-ResourceSetToReleaseList                SEQUENCE {SIZE{1..maxNrofSRS-
ResourceSets}} OF SRS-ResourceSetId             OPTIONAL, -- Need N
    srs-ResourceToAddModList                    SEQUENCE {SIZE{1..maxNorfSRS-
Resources}} OF SRS-ResourceSet                  OPTIONAL, -- Need N
    srs-ResourceToReleaseList                   SEQUENCE {SIZE{1..maxNrofSRS-
Resources}} OF SRS-ResourceId                   OPTIONAL, -- Need N
    srs-ResourceToAddModList                    SEQUENCE {SIZE{1..maxNrofSRS-
Resources}} OF SRS-Resource                     OPTIONAL, -- Need N
    cpc-Accumulation                            ENUMERATED {disabled}
    ...
}
SRS-ResourceSet ::=                         SEQUENCE {
    srs-ResourceSetId                           SRS-ResourceSetId,
    srs-ResourceSetList                         SEQUENCE {SIZE(1..maxNrofSRS-
ResourcesPerSet}} OF SRS-ResourceId             OPTIONAL, -- Cond Setup
    resourceType                                CHOICE {
        asperiodic                                  SEQUENCE {
            aperiodicSRS-ResourceTrigger                INTEGER {1..maxNorfSRS-
TriggerStates-1);
            csi-RS                                      NZP-CSI-RS-ResourceId
            slotOffset                                  INTEGER (1..32)
            ...
        },
        semi-persistent                             SEQUENCE {
            associatedCSI-RS                            NZP-CSI-RS-ResourceId
            ...
        },
        periodic                                    SEQENCE {
            associatedCSI-RS                            NZP-CSI-RS-ResourceId
            ...
        }
    },
    usage                                       ENUMERATED {beamManagement,
codebook, nonCodebook, antennaSwitching},
    alpha                                       Alpha
    p0                                          INTEGER (-202..24)
    pathlossReferenceRS                         CHOICE {
        ssb-Index                                   SSB-Index,
        csi-RS-Index                                NZP-CSI-RS-ResourceId
SRS-SpatialRelationInfo ::=                 SEQUENCE {
    servingCellId                               ServCellIndex
    referenceSignal                             CHOICE {
        ssb-Index                                   SSB-Index,
        csi-RS-Index                                NZP-CSI-RS-ResourceId,
        srs                                         SEQUENCE {
            resourceId                                  SRS-ResourceId,
            uplinkBWP                                   SNP-Id
        }
    }
}
SRS-ResourceId ::=                          INTEGER (0..maxNrofSRS-Resources-1)
```

In Table 6, usage refers to a higher layer parameter to indicate whether the SRS resource set is used for beam management or is used for codebook based or non-codebook based transmission. The usage parameter corresponds to L1 parameter 'SRS-SetUse'. 'spatialRelationInfo' is a parameter representing a configuration of spatial relation between a reference RS and a target SRS. The reference RS may be SSB, CSI-RS, or SRS which corresponds to L1 parameter 'SRS-SpatialRelationInfo'. The usage is configured per SRS resource set.

The UE determines the Tx beam for the SRS resource to be transmitted based on SRS-SpatialRelation Info contained in the SRS-Config IE in S920. The SRS-SpatialRelation Info is configured per SRS resource and indicates whether to apply the same beam as the beam used for SSB, CSI-RS, or SRS per SRS resource. Further, SRS-SpatialRelationInfo may be configured or not configured in each SRS resource.

If the SRS-SpatialRelationInfo is configured in the SRS resource, the same beam as the beam used for SSB, CSI-RS or SRS is applied for transmission. However, if the SRS-SpatialRelationInfo is not configured in the SRS resource, the UE randomly determines the Tx beam and transmits the SRS via the determined Tx beam in S930.

More specifically, for P-SRS with 'SRS-ResourceConfig-Type' set to 'periodic':

i) if SRS-SpatialRelationInfo is set to 'SSB/PBCH,' the UE transmits the corresponding SRS resource with the same spatial domain transmission filter (or generated from the corresponding filter) as the spatial domain Rx filter used for the reception of the SSB/PBCH, or ii) if SRS-SpatialRelationInfo is set to 'CSI-RS,' the UE transmits the SRS resource with the same spatial domain transmission filter used for the reception of the periodic CSI-RS or SP CSI-RS; or iii) if SRS-SpatialRelationInfo is set to 'SRS,' the UE transmits the SRS resource with the same spatial domain transmission filter used for the transmission of the periodic SRS.

Even if 'SRS-ResourceConfigType' is set to 'SP-SRS' or 'AP-SRS,' the beam determination and transmission operations may be applied similar to the above.

Additionally, the UE may receive or may not receive feedback for the SRS from the base station, as in the following three cases in S940.

i) If Spatial_Relation_Info is configured for all the SRS resources within the SRS resource set, the UE transmits the SRS with the beam indicated by the base station. For example, if the Spatial_Relation_Info indicates all the same SSB, CRI, or SRI, the UE repeatedly transmits the SRS with the same beam. This case corresponds to (a) of FIG. 8 as the usage for the base station to select the Rx beam.

ii) The Spatial_Relation_Info may not be configured for all the SRS resources within the SRS resource set. In this case, the UE may perform transmission while freely changing SRS beams. That is, this case corresponds to (b) of FIG. 8 as the usage for the UE to sweep the Tx beam.

iii) The Spatial_Relation_Info may be configured for only some SRS resources within the SRS resource set. In this case, the UE may transmit the configured SRS resources with the indicated beam, and transmit the SRS resources, for which Spatial_Relation_Info is not configured, by randomly applying the Tx beam.

FIG. 10 is a flowchart showing an example of an uplink transmission/reception operation to which a method proposed in the present disclosure may be applied.

Referring to FIG. 10, the eNB schedules uplink transmission such as the frequency/time resource, the transport layer, an uplink precoder, the MCS, etc., (S1010). In particular, the eNB may determine a beam for PUSCH transmission of the UE through the aforementioned operations.

The UE receives DCI for downlink scheduling (i.e., including scheduling information of the PUSCH) on the PDCCH (S1020).

DCI format 0_0 or 0_1 may be used for the uplink scheduling and in particular, DCI format 0_1 includes the following information.

Identifier for DCI formats, UL/Supplementary uplink (SUL) indicator, Bandwidth part indicator, Frequency domain resource assignment, Time domain resource assignment, Frequency hopping flag, Modulation and coding scheme (MCS), SRS resource indicator (SRI), Precoding information and number of layers, Antenna port(s), SRS request, DMRS sequence initialization, and Uplink Shared Channel (UL-SCH) indicator.

In particular, configured SRS resources in an SRS resource set associated with higher layer parameter 'usage' may be indicated by an SRS resource indicator field. Further, 'spatialRelationInfo' may be configured for each SRS resource and a value of 'spatialRelationInfo' may be one of {CRI, SSB, and SRI}.

The UE transmits the uplink data to the eNB on the PUSCH (S1030).

When the UE detects a PDCCH including DCI format 0_0 or 0_1, the UE transmits the corresponding PUSCH according to the indication by the corresponding DCI.

Two transmission schemes, i.e., codebook based transmission and non-codebook based transmission are supported for PUSCH transmission:

i) When higher layer parameter txConfig' is set to 'codebook', the UE is configured to the codebook based transmission. On the contrary, when higher layer parameter txConfig' is set to 'nonCodebook', the UE is configured to the non-codebook based transmission. When higher layer parameter 'txConfig' is not configured, the UE does not predict that the PUSCH is scheduled by DCI format 0_1. When the PUSCH is scheduled by DCI format 0_0, the PUSCH transmission is based on a single antenna port.

In the case of the codebook based transmission, the PUSCH may be scheduled by DCI format 0_0, DCI format 0_1, or semi-statically. When the PUSCH is scheduled by DCI format 0_1, the UE determines a PUSCH transmission precoder based on the SRI, the Transmit Precoding Matrix Indicator (TPMI), and the transmission rank from the DCI as given by the SRS resource indicator and the Precoding information and number of layers field. The TPMI is used for indicating a precoder to be applied over the antenna port and when multiple SRS resources are configured, the TPMI corresponds to the SRS resource selected by the SRI. Alternatively, when the single SRS resource is configured, the TPMI is used for indicating the precoder to be applied over the antenna port and corresponds to the corresponding single SRS resource. A transmission precoder is selected from an uplink codebook having the same antenna port number as higher layer parameter 'nrofSRS-Ports'.

When higher layer parameter 'txConfig' set to 'codebook' is configured for the UE, at least one SRS resource is configured in the UE. An SRI indicated in slot n is associated with most recent transmission of the SRS resource identified by the SRI and here, the SRS resource precedes PDCCH (i.e., slot n) carrying the SRI.

ii) In the case of the non-codebook based transmission, the PUSCH may be scheduled by DCI format 0_0, DCI format 0_1, or semi-statically. When multiple SRS resources are configured, the UE may determine the PUSCH precoder and the transmission rank based on a wideband SRI and here, the SRI is given by the SRS resource indicator in the DCI or given by higher layer parameter 'srs-ResourceIndicator'. The UE may use one or multiple SRS resources for SRS transmission and here, the number of SRS resources may be configured for simultaneous transmission in the same RB based on the UE capability. Only one SRS port is configured for each SRS resource. Only one SRS resource may be configured to higher layer parameter 'usage' set to 'nonCodebook'. The maximum number of SRS resources which may be configured for non-codebook based uplink transmission is 4. The SRI indicated in slot n is associated with most recent transmission of the SRS resource identified by the SRI and here, the SRS transmission precedes PDCCH (i.e., slot n) carrying the SRI.

Multi Panel Operation

Hereinafter, matters related to the definition of a panel in the present disclosure will be described in detail.

A "panel" referred to in the present disclosure may be based on at least one of the following definitions.

According to an embodiment, the "panel" may be interpreted/applied by being transformed into "one panel or a plurality of panels" or a "panel group". The panel may be related to a specific characteristic (e.g., a timing advance (TA), a power control parameter, etc.). The plurality of panels may be panels having a similarity/common value in terms of the specific characteristic.

According to an embodiment, a "panel" may be interpreted/applied by being transformed into "one antenna port or a plurality of antenna ports", "one uplink resource or a plurality of uplink resources", an "antenna port group" or an "uplink resource group (or set)". The antenna port or the uplink resource may be related to a specific characteristic (e.g., a timing advance (TA), a power control parameter, etc.). The plurality of antenna ports (uplink resources) may be antenna ports (uplink resources) having a similarity/common value in terms of the specific characteristic.

According to an embodiment, a "panel" may be interpreted/applied by being transformed into "one beam or a plurality of beams" or "at least one beam group (or set)". The beam (beam group) may be related to a specific characteristic (e.g., a timing advance (TA), a power control parameter, etc.). The plurality of beams (beam groups) may be beams (beam groups) having a similarity/common value in terms of the specific characteristic.

According to an embodiment, a "panel" may be defined as a unit for a UE to configure a transmission/reception beam. For example, a "transmission panel (Tx panel)" may be defined as a unit in which a plurality of candidate transmission beams can be generated by one panel, but only one of the beams can be used for transmission at a specific time (that is, only one transmission beam (spatial relation information RS) can be used per Tx panel in order to transmit a specific uplink signal/channel).

According to an embodiment, a "panel" may refer to "a plurality antenna ports (or at least one antenna port)", a "antenna port group" or an "uplink resource group (or set)" with common/similar uplink synchronization. Here, the "panel" may be interpreted/applied by being transformed into a generalized expression of "uplink synchronization unit (USU)". Alternatively, the "panel" may be interpreted/applied by being transformed into a generalized expression of "uplink transmission entity (UTE)".

Additionally, the "uplink resource (or resource group)" may be interpreted/applied by being transformed into an resource (or a resource group (set)) of a physical uplink shared channel (PUSCH)/physical uplink control channel (PUCCH)/sounding reference signal (SRS)/physical random access channel (PRACH). Conversely, a resource (resource group) of a PUSCH/PUCCH/SRS/PRACH may be interpreted/applied as an "uplink resource (or resource group)" based on the definition of the panel.

In the present disclosure, an "antenna (or antenna port)" may represent a physical or logical antenna (or antenna port).

As described above, a "panel" referred to in the present disclosure can be interpreted in various ways as "a group of UE antenna elements", "a group of UE antenna ports", "a group of logical antennas", and the like. Which physical/logical antennas or antenna ports are mapped to one panel may be variously changed according to position/distance/correlation between antennas, an RF configuration and/or an antenna (port) virtualization method. The phaming process may vary according to a UE implementation method.

In addition, the "panel" referred to in the present disclosure may be interpreted/applied by being transformed into "a plurality of panels" or a "panel group" (having similarity in terms of specific characteristics).

Multi Panel Structure

Hereinafter, matters related to implementation of a multi-panel will be described.

In the implementation of a UE in a high frequency band, modeling of a UE having a plurality of panels consisting of one or a plurality of antennas is being considered (e.g., bi-directional two panels in 3GPP UE antenna modeling). Various forms may be considered in implementing such a multi-panel. This is described below in detail with reference to FIGS. 11 and 12.

FIG. 11 and FIG. 12 illustrate an example of multi-panel based on an RF switch applied to the disclosure.

A plurality of panels may be implemented based on an RF switch.

Referring to FIG. 11, only one panel may be activated at a time, and signal transmission may be impossible for a predetermined time during which the activated panel is changed (i.e., panel switching).

FIG. 12 illustrates a plurality of panels according to different implementation schemes. Each panel may have an RF chain connected thereto so that it may be activated at any time. In this case, the time taken for panel switching may be zero or very short, and depending on the modem and power amplifier configuration, multiple panels may be simultaneously activated to transmit signals simultaneously (STxMP: simultaneous transmission across multi-panel).

In a UE having a plurality of panels described above, the radio channel state may be different for each panel, and the RF/antenna configuration may be different for each panel. Therefore, a method for estimating a channel for each panel is required. In particular, 1) to measure uplink quality or manage uplink beams or 2) to measure downlink quality for each panel or manage downlink beams using channel reciprocity, the following procedure is required.

A procedure for transmitting one or a plurality of SRS resources for each panel (here, the plurality of SRS resources may be SRS resources transmitted on different beams within one panel or SRS resources repeatedly transmitted on the same beam).

For convenience of description below, a set of SRS resources transmitted based on the same usage and the same time domain behavior in the same panel is referred to as an SRS resource group. The usage may include at least one of beam management, antenna switching, codebook-based PUSCH, or non-codebook based PUSCH. The time-domain behavior may be an operation based on any one of aperiodic, semi-persistent, and periodic.

The SRS resource group may use the configuration for the SRS resource set supported in the Rel-15 NR system, as it is, or separately from the SRS resource set, one or more SRS resources (based on the same usage and time-domain behavior) may be configured as the SRS resource group. In relation to the same usage and time-domain behavior, in the case of Rel-15, a plurality of SRS resource sets may be configured only when the corresponding usage is beam management. It is defined that simultaneous transmission is impossible between SRS resources configured in the same SRS resource set, but simultaneous transmission is possible between the SRS resources belonging to different SRS resource sets.

When considering the panel implementation scheme and multi-panel simultaneous transmission as shown in FIG. 12, the concept described above in connection with the SRS resource set may be directly applied to the SRS resource group. When considering panel switching according to the panel implementation scheme according to FIG. 11, an SRS resource group may be defined separately from the SRS resource set.

For example, a specific ID may be assigned to each SRS resource such that resources having the same ID belong to the same SRS resource group (SRS resource group) and resources having different IDs belong to different resource groups.

For example, when four SRS resource sets (e.g., RRC parameter usage is configured to 'BeamManagement') configured for a beam management (BM) usage are configured to the UE, each SRS resource set may be configured and/or defined to correspond to each panel of the UE. As an example, when four SRS resource sets are represented by SRS resource sets A, B, C, and D, and the UE implements a total of four (transmission) panels, each SRS resource set corresponds to one (transmission) panel to perform the SRS transmission.

As an example, implementation of the UE shown in Table 7 may be possible.

TABLE 7

| Maximum number of SRS resource sets across all time domain behavior (periodic/semi-persistent/aperiodic) | Additional constraint on the maximum of SRS resource sets per supported time domain behavior (periodic/semi-persistent/aperiodic) |
| --- | --- |
| 1 | 1 |
| 2 | 1 |
| 3 | 1 |
| 4 | 2 |
| 5 | 2 |
| 6 | 2 |
| 7 | 4 |
| 8 | 4 |

Referring to contents of Table 7, when the UE reports (or transmits), to the BS, UE capability information in which the number of SRS resource sets which may be supported by the UE itself is 7 or 8, the corresponding UE may be configured with up to a total of four SRS resource sets (for the BM usage) from the BS. In this case, as an example, the UE may also be defined, configured, and/or indicated to perform uplink transmission by making each of the SRS resource sets (for the BM usage) correspond to each panel (transmission panel and/or reception panel) of the UE. That is, an SRS resource set(s) for a specific usage (e.g., BM usage) configured to the UE may be defined, configured, and/or indicated to correspond to the panel of the UE. As an example, when the BS (implicitly or explicitly) configures and/or indicates, to the UE, a first SRS resource set in relation to the uplink transmission (configured for the BM usage), the corresponding UE may recognize to perform the uplink transmission by using a panel related (or corresponding) to the first SRS resource set.

Further, like the UE, when the UE that supports four panels transmits each panel to correspond to one SRS resource set for the BM usage, information on the number of SRS resources configurable per SRS resource set may also be include in the capability information of the UE. Here, the number of SRS resources may correspond to the number of transmittable beams (e.g., uplink beams) per panel of the UE. For example, the UE in which four panels are implemented may be configured to perform the uplink transmission in such a manner that two uplink beams correspond to two configured RS resources, respectively for each panel.

Multi Panel UE Category (MPUE Category)

With respect to multi-panel transmission, UE category information may be defined in order for a UE to report performance information thereof related to multi-panel transmission. As an example, three multi-panel UE (MPUE) categories may be defined, and the MPUE categories may be classified according to whether a plurality of panels can be activated and/or whether transmission using a plurality of panels is possible.

In the case of the first MPUE category (MPUE category 1), in a UE in which multiple panels are implemented, only one panel may be activated at a time, and a delay for panel switching and/or activation may be set to [X]ms. For example, the delay may be set to be longer than a delay for beam switching/activation and may be set in units of symbols or slots.

In the case of the second MPUE category (MPUE category 2), in a UE in which multiple panels are implemented, multiple panels may be activated at a time, and one or more panels may be used for transmission. That is, simultaneous transmission using panels may be possible in the second MPUE category.

In the case of the third MPUE category (MPUE category 3), in a UE in which multiple panels are implemented, multiple panels may be activated at a time, but only one panel may be used for transmission.

With respect to multi-panel-based signal and/or channel transmission/reception proposed in the present disclosure, at least one of the three MPUE categories described above may be supported. For example, in Rel-16, MPUE category 3 among the following three MPUE categories may be (optionally) supported.

In addition, information on an MPUE category may be predefined on the standards or semi-statically configured according to a situation in a system (i.e., a network side or a UE side) and/or dynamically indicated. In this case, configuration/indication related to multi-panel-based signal and/or channel transmission/reception may be performed in consideration of the MPUE category.

Panel-Specific Transmission/Reception

Hereinafter, matters related to configuration/indication related to panel-specific transmission/reception will be described.

With respect to a multi-panel-based operation, transmission and reception of signals and/or channels may be panel-specifically performed. Here, "panel-specific" may mean that transmission and reception of signals and/or channels in units of panels can be performed. Panel-specific transmission/reception may also be referred to as panel-selective transmission/reception.

With respect to panel-specific transmission and reception in the multi-panel-based operation proposed in the present disclosure, a method of using identification information (e.g., an identifier (ID), an indicator, etc.) for setting and/or indicating a panel to be used for transmission and reception among one or more panels may be considered.

As an example, an ID for a panel may be used for panel selective transmission of a PUSCH, a PUCCH, an SRS, and/or a PRACH among a plurality of activated panels. The ID may be set/defined based on at least one of the following four methods (Alts 1, 2, 3, and 4).

Alt.1: ID for a panel may be an SRS resource set ID.

As an example, when the aspects according to a) to c) below are considered, it may be desirable that each UE Tx panel correspond to an SRS support set that is set in terms of UE implementation.

a) SRS resources of multiple SRS resource sets having the same time domain operation are simultaneously transmitted in the same bandwidth part (BWP).

b) Power control parameters are set in units of SRS resource sets.

c) A UE reports a maximum of 4 SRS resource sets (which may correspond to up to 4 panels) according to A supported time domain operation.

In the case of Alt.1 method, an SRS resource set related to each panel may be used for "codebook" and "non-codebook" based PUSCH transmission. In addition, a plurality of SRS resources belonging to a plurality of SRS resource sets may be selected by extending an SRI field of DCI. A mapping table between a sounding reference signal resource indicator (SRI) and an SRS resource may need to be extended to include the SRS resource in all SRS resource sets.

Alt.2: ID for a panel may be an ID (directly) associated with a reference RS resource and/or a reference RS resource set.

Alt.3: ID for a panel may be an ID directly associated with a target RS resource (reference RS resource) and/or a reference RS resource set.

In the case of Alt.3 method, configured SRS resource set(s) corresponding to one UE Tx panel can be controlled more easily, and the same panel identifier can be allocated to a plurality of SRS resource sets having different time domain operations.

Alt.4: ID for a panel may be an ID additionally set in spatial relation info (e.g., RRC parameter (SpatialRelationInfo)).

The Alt.4 method may be a method of newly adding information for indicating an ID for a panel. In this case, configured SRS resource set(s) corresponding to one UE Tx panel can be controlled more easily, and the same panel identifier can be allocated to a plurality of SRS resource sets having different time domain operations.

As an example, a method of introducing a UL TCI similarly to the existing DL TCI (Transmission Configuration Indication) may be considered. Specifically, UL TCI state definition may include a list of reference RS resources (e.g., SRS, CSI-RS and/or SSB). The current SRI field may be reused to select a UL TCI state from a configured set. Alternatively, a new DCI field (e.g., UL-TCI field) of DCI format 0_1 may be defined for the purpose of indicating the UL TCI state.

Information (e.g., panel ID, etc.) related to the above-described panel-specific transmission and reception can be transmitted through higher layer signaling (e.g., RRC message, MAC-CE, etc.) and/or lower layer signaling (e.g., L1 signaling, DCI, etc.). The information may be transmitted from a base station to a UE or from the UE to the base station according to circumstances or as necessary.

Further, the corresponding information may be set in a hierarchical manner in which a set for a candidate group is set and specific information is indicated.

Further, the above-described panel-related identification information may be set in units of a single panel or in units of multiple panels (e.g., a panel group or a panel set).

Hereinafter, the matters related to the panel/beam instruction will be reviewed.

Uplink Transmission Configuration Indicator Framework (UL TCI Framework)

In Rel-15 NR, spatialRelationInfo may be utilized to indicate a transmission beam to be utilized when a base station transmits a UL channel to a UE. The base station may configure/indicate a DL reference signal (e.g., SSB-RI, CRI (P/SP/AP)) or an SRS (i.e., SRS resource) to the UE as a reference RS for the target UL channel and/or target RS through RRC configuration. Thus, the base station may indicate which UL transmission beam to use when the corresponding UE transmits a PUCCH and an SRS. In addition, when the base station schedules the PUSCH to the UE, the SRS transmission beam indicated by the base station may be indicated as a transmission beam for PUSCH transmission through an SRI field, and the SRS transmission beam may be used as a PUSCH transmission beam of the UE.

In addition, there are two UL MIMO transmission schemes for PUSCH transmission of Rel-15 NR, and a codebook based (CB) UL transmission scheme and a non-codebook based (NCB) UL transmission scheme may be considered.

Hereinafter, "transmission of an SRS resource set" in the present disclosure may be used in the same meaning as "transmission of an SRS based on information configured in the SRS resource set," and "transmission of an SRS resource" or "transmission of SRS resources" may be used in the same meaning as "transmission of an SRS or SRSs based on information configured in an SRS resource."

In the case of the CB UL transmission scheme, the base station may first configure and/or indicate an SRS resource set of 'CB' purposes (e.g., usage) to a UE, and the UE may transmit an SRS based on a certain n port SRS resource in the corresponding SRS resource set. The base station may acquire UL channel-related information based on the corresponding SRS transmission, and may utilize the UL channel-related information for PUSCH scheduling of a UE.

Thereafter, the base station may perform PUSCH scheduling through UL DCI, and may indicate an SRS resource for 'CB' purposes previously used for SRS transmission of a UE through an SRI field of DCI, and accordingly, the base station may indicate a PUSCH transmission beam of a UE. In addition, the base station may indicate an uplink codebook through a TPMI field, and accordingly, the base station may indicate a UL rank and a UL precoder to the UE. The corresponding UE may perform PUSCH transmission as indicated by the base station.

In the case of the NCB UL transmission scheme, the base station may first configure and/or indicate an SRS resource set of 'non-CB' purposes (e.g., usage) to a UE, and the UE may determine a precoder to be applied to SRS resources (up to 4 resources, 1 port per resource) in the corresponding SRS resource set based on the reception of NZP CSI-RS linked to the corresponding SRS resource set. The corresponding UE may simultaneously transmit the SRS based on the corresponding SRS resources based on the determined precoder. Thereafter, the base station may perform PUSCH scheduling through UL DCI, and may indicate some of SRS resources for 'non-CB' purposes previously used for SRS transmission of the UE through an SRI field of DCI, and accordingly, the base station may indicate a PUSCH transmission beam of the UE. In addition, simultaneously, the base station may indicate a UL rank and a UL precoder through the SRI field. The corresponding UE may perform PUSCH transmission as indicated by the base station.

Regarding the indication of the panel and/or beam of a UE in uplink transmission, the base station may configure/indicate panel-specific transmission for UL transmission through the following Alt.2 or Alt.3.

Alt.2: Introducing a UL-TCI framework and supporting UL-TCI-based signaling similar to a DL beam indication supported in Rel-15

A new panel ID may or may not be introduced.

A panel specific signaling is performed using UL-TCI state.

Alt.3: A new panel-ID is introduced. The corresponding panel-ID may be implicitly/explicitly applied to transmission for a target RS resource/resource set, PUCCH resource, SRS resource, or PRACH resource.

Panel-specific signaling is performed implicitly (e.g., by DL beam reporting enhancement) or explicitly using a new panel ID.

When signaling is explicitly performed, the panel-ID may be configured in a target RS/channel or a reference RS (e.g., DL RS resource configuration or spatial relation info).

A new MAC CE may not be designated for the panel ID.

Table 8 below illustrates a UL-TCI state based on the Alt.2.

TABLE 8

| Valid UL-TCI state Configuration | Source (reference) RS | (target) UL RS | [qcl-Type] |
|---|---|---|---|
| 1 | SRS resource (for BM) + [panel ID] | DM-RS for PUCCH or SRS or PRACH | Spatial-relation |
| 2 | DL RS(a CSI-RS resource or a SSB) + [panel ID] | DM-RS for PUCCH or SRS or PRACH | Spatial-relation |
| 3 | DL RS(a CSI-RS resource or a SSB) + [panel ID] | DM-RS for PUSCH | Spatial-relation + [port(s)-indication] |
| 4 | DL RS(a CSI-RS resource or a SSB) and SRS resource + [panel ID] | DM-RS for PUSCH | Spatial-relation + [port(s)-indication] |
| 5 | SRS resource + [panel ID] | DM-RS for PUSCH | Spatial-relation + [port(s)-indication] |
| 6 | UL RS(a SRS for BM) and SRS resource + [panel ID] | DM-RS for PUSCH | Spatial-relation + [port(s)-indication] |

In addition, as shown in Table 8 above, an integrated framework for the base station to configure and/or indicate a transmission panel/beam for the UL channel and/or UL RS of a UE may be considered. The framework may be referred to as a UL-TCI framework for convenience of description as an example. The UL-TCI framework may be a form of extending a DL-TCI framework considered previously (e.g., Rel-15 NR system) to UL. When based on the UL-TCI framework, the base station may configure DL RS (e.g., SSB-RI, CRI) and/or UL RS (e.g., SRS) to a UE through higher layer signaling (e.g., RRC configuration) as a reference RS or source RS to be utilized/applied as a transmission beam for a target UL channel (e.g., PUCCH, PUSCH, PRACH) and/or target UL RS (e.g., SRS). When transmitting the target UL channel and/or the target UL RS, the corresponding UE may utilize the transmission beam of a reference RS or a source RS configured by the base station.

When the UL-TCI framework is applied, there is an advantage in that overhead and delay can be reduced when configuring and/or indicating a PUSCH transmission beam compared to the existing 'SRI-based PUSCH scheduling and PUSCH beam indication' scheme in which an SRS for 'CB' or 'non-CB' purposes needs be transmitted before SRI indication for PUSCH transmission. In addition, the method based on the UL-TCI framework also has an advantage that it can be integrally applied to all UL channels/RSs such as PUCCH/PUSCH/PRACH/SRS.

Panel-Selective PUCCH Transmission

Hereinafter, in the present disclosure, methods related to panel-selective transmission that may be applied in consideration of the aforementioned contents are proposed. In the present disclosure, panel-selective transmission may refer to a transmission method configured/indicated/performed in units of a panel (set, group), and may also be referred to as a panel-specific transmission method.

Panel selective PUCCH transmission may be classified in two different schemes as follows.

Option 1: A panel may be identified in PUCCH-SpatialRelationInfo.

Option 2: A panel may be identified according to a PUCCH resource configuration, for example, a PUCCH resource (or PUCCH resource group).

Regarding panel identification, there may be four alternatives Alt.1 to Alt4 as follows.

Alt.1: SRS resource set ID

Alt.2: ID directly linked to a reference RS resource and/or a reference RS resource set Alt.3: ID that can be assigned to a target RS resource or a target RS resource set Alt.4: ID additionally set in spatial relation info Option 1 is directly correlated with Alt.4, and PUCCH-SpatialRelationInfo is an RRC parameter including a reference RS resource and thus may be understood as a part of Alt.2.

Option 2 is related to Alt.3 in that the intention of option 2 is to identify a UE panel per target "PUCCH resource(s)" for transmission.

Alt.1 may be applied to option 1 and option 2 when an existing ID of Rel-15 is intended to be reused.

In terms of technical differences between option 1 and option 2, option 1 has a limitation that a maximum number of configurable reference RSs can be reduced by the number of activated UE Tx panels.

As an example, the same reference RS as shown in FIG. 13 (e.g., RS7) cannot be associated with multiple UE panels according to option 1 unless duplicate allocation for unless other PUCCH-SpatialRelationInfo values, for example, RS8 (=RS7) is used.

FIG. 13 is a diagram showing an example of association between a panel and a reference signal proposed in the present disclosure. The example shown in FIG. 13 is based on option 1. Specifically, referring to FIG. 13, when two Tx panels are activated in a UE, some PUCCH-SpatialRelationInfo values may be associated with UE panel 1 (Panel 1) and other PUCCH-SpatialRelationInfo values may be associated with UE panel 2 (Panel 2). This inevitably reduces a maximum number of configurable reference RSs in a list of PUCCH-SpatialRelationInfo values.

FIG. 14 is a diagram showing another example of association between a panel and a reference signal proposed in the present disclosure. The example shown in FIG. 14 is based on option 2.

Referring to FIG. 14, the same reference RS (e.g., RS7) may be associated with a plurality of UE panels through different PUCCH resources without affecting the maximum number of configurable reference RSs in the list of PUCCH-SpatialRelationInfo values. More specifically, RS7 is a DL RS and is associated with both PUCCH resources #9 and #125, and the resources are associated with different UE panels. At this time, the UE may transmit a PUCCH on PUCCH resource #125 having the corresponding beam and panel #1 used to receive RS7. In addition, the UE may transmit the PUCCH on PUCCH resource #9 having the corresponding beam and panel #2 used to receive the same RS7.

Referring to the examples of FIGS. 13 and 14, a panel related to panel-selective PUCCH transmission may be identified based on at least one of the following i) and ii).
  i) "PUCCH-SpatialRelationInfo" related configuration (option 1)
  ii) "PUCCH resource" related configuration (option 2)

The above description (3GPP system, frame structure, NR system, etc.) can be applied in combination with methods proposed in the present disclosure which will be described later or supplemented to clarify the technical characteristics of the methods proposed in the present disclosure. The methods described below are only divided for convenience of description, and some components of one method may be substituted with some components of another method or may be applied in combination therewith.

There are two UL MIMO transmission schemes for PUSCH transmission of Rel-15 NR, a codebook based (CB) UL and a non-codebook based (NCB) UL. After NR Rel-16, in addition to transparent multi-panel transmission of a UE between the UE and the base station, the following operation may be considered. Specifically, in a state in which the base station and the UE recognize a multi-panel of the UE, panel switching/selection-based transmission or simultaneous transmission across multi-panel (STxMP) may be configured/indicated/scheduled by the base station to the UE and performed by the UE. This UE operation may be applied not only to uplink data (UL data) (e.g., PUCCH) transmission of the UE, but also an uplink control channel (UL control channel) (e.g., PUCCH) and an uplink reference signal (UL RS) (e.g., SRS, PRACH) transmission.

Hereinafter, in the present disclosure, a method for independently controlling a transmission panel and/or beam of a UE by a base station, a method for proposing an operation related to transmission panel switching/selection of a timer-based UE and determining a transmission panel and/or a beam associated with a UE, and a transmission method accordingly will be described.

In the current NR system, in relation to the update/indication of beam-related information (e.g., spatial relation, (UL-) TCI state, etc.) for each PUCCH resource, the method according to following 1) and 2) is being considered.
  1) Updating/indicating beam related information individually
  2) Updating/indicating common specific beam-related information (e.g., spatial relation, (UL-)TCI state, etc.) for a plurality of PUCCH resources at once (that is, simultaneously)

According to the method of 2), an overhead and/or latency in an operation related to a panel/beam-related configuration and/or indication may be reduced.

In relation to the method of 2), the following may be considered.

To support simultaneous update/indication of a single spatial relation per group of PUCCH using one MAC CE, the following options may be considered for the corresponding group.

At least up to two groups per BWP

Detailed information on group configuration including whether to use an implicit method or an explicit method may be considered.

For example, detailed information corresponding to each different TRP/panel, at least for multiple TRPs/panels, may be considered. As another example, detailed information corresponding to each different active spatial relation, at least for a single TRP, may be considered.

When a UE performs a specific transmission (e.g., uplink transmission), the corresponding UE (Tx) needs to determine a specific (Tx) panel and/or a specific (Tx) beam based panel-related information and/or (Tx) beam-related information (e.g., spatial relation), or (UL-)TCI state, etc.). In this connection, the base station may be configured to configure/indicate/update the (Tx) panel-related information and/or (Tx) beam-related information (e.g., spatial relation, or (UL-)TCI state, etc.).

In this connection, the base station may explicitly (or, implicitly according to a specific/predefined/pre-configured rule) configure/indicate/update all of the (Tx) panel-related information and/or (Tx) beam-related information (e.g., spatial relation, or (UL-)TCI state, etc.), and the corresponding UE may be configured to follow the configured/indicated/updated information.

In this regard, in the present disclosure, the base station discusses/proposes a scheme that allows only the "(UE Tx) panel related information" to separately/independently configure/indicate/update. In other words, a scheme in which the base station configures/indicates/updates only specific "(UE Tx) panel-related information" independently of the "beam-related information (e.g., spatial relation, or (UL-) TCI state, etc.)" (with intent) may be considered. In this connection, advantages/effects may be obtained from the viewpoint of the UE and the base station/network implementation, which will be described later.

Hereinafter, in the present disclosure, for convenience of description, the "(UE Tx) panel-related information" is exemplified as "panel ID", but in addition to this, the panel-related information may be configured and/or indicated (in a specific modified explicit/implicit manner) in various forms, and this may be included in the spirit of the present disclosure.

Hereinafter, the following description is divided into proposals for convenience of description, but some components of each proposal may be substituted with configurations of other proposals, or may be applied in combination with each other.

[Proposal 1]

The indication configuration/change of (UE Tx) panel ID (e.g., p=0, 1, 2, or 3) may be performed individually from (beam-related) spatial-relation RS indication configuration/change.

In other words, in Proposal 1, a method in which configuration and/or indication for panel-related information is performed independently of configuration and/or indication for beam-related information will be described.

For example, when the spatial-relation RS is a downlink reference signal (DL RS) (e.g., a CRI or an SSBRI), the same scheme as in option 2 described in relation to the panel selective PUCCH transmission (FIGS. 13 and 14) may be applied. According to option 2, the panel may be identified according to a PUCCH resource composition, for example, a PUCCH resource (or PUCCH resource group). In this connection, the UL beam indication is independent of the panel (panel ID) indication. Even when the UL beam indications are the same (e.g., the same DL RS), if the panel (panel ID) is different, a UE transmits an uplink signal to the corresponding panel using the beam (corresponding beam) from which the DL RS was received.

Thus, the base station can effectively configure/indicate/update only the "(UE Tx) panel related information" to the UE.

In other words, RSs that are spatial-relation reference targets may be configured regardless of the panel ID value (i.e., p value) (as universal/common-pool). In this connection, it may be effective to independently change only the panel ID value (i.e., p value) in consideration of the same type of operation as option 2 of the panel selective PUCCH transmission. Even when only the panel ID value (i.e., p value) is changed and the state in which spatial-relation RS for each PUCCH resource is configured does not change, this may mean to receive and measure the signal reception/measurement corresponding to the same corresponding Tx RS ID with another (UE Tx/Rx) panel.

For another example, when the spatial-relation RS is a specific UL RS (e.g., SRS resource (with SRS resource indicator; SRI)), the following UE and base station operations may be defined/configured/indicated. Hereinafter, for convenience, the spatial-relation RS is illustrated as an SRS, but a scheme described below may be extended and applied also to other RSs.

As described above, when the spatial-relation RS is an SRS, the SRS may be an SRS for use in beam management ((UL) beam management/sweeping). The use may be configured/indicated in the form of an explicit configuration (e.g., 'usage' parameter for the SRS, set to 'beamManagement').

As an example, when a UE in which 4 (Tx) panels are implemented/equipped/constructed is sweeping 4 beams for each panel, a beam management (BM) SRS (resource) ID and a panel ID (i.e., p value) for the corresponding UE may be as shown in Table 9 below.

TABLE 9 p = 0, SRI = 0, 1, 2, 3
p = 1, SRI = 4, 5, 6, 7
p = 2, SRI = 8, 9, 10, 11
p = 3, SRI = 12, 13, 14, 15

Referring to Table 9, the SRI may be configured to an ID that does not overlap another (globally), and it may be determined based on which panel of a UE the SRS is transmitted by the p value.

As an example, the UE receiving the BM-SRS-related configuration of Table 9 may be configured/indicated/defined to perform SRS transmission to which beam and/or panel sweeping of the following form is applied.

When transmitting SRS corresponding to {p=0, SRI=0}, the UE may initiate SRS transmission through an SRI=0 resource to which a specific UL beam is applied through (UE Tx) panel p=0.

When transmitting SRS corresponding to {p=0, SRI=1}, the UE may initiate SRS transmission through an SRI=1 resource to which a specific UL beam is applied through (UE Tx) panel p=0 (different/independent from that applied to {p=0, SRI=0} above).

When transmitting an SRS corresponding to {p=0, SRI=2}, the UE may initiate SRS transmission through an SRI=2 resource to which a specific UL beam is applied through (UE Tx) panel p=0 (different/independent from that applied to ({p=0, SRI=0} and) {p=0, SRI=1} above).

When transmitting an SRS corresponding to {p=0, SRI=3}, the UE may initiate SRS transmission through an SRI=3 resource to which a specific UL beam is applied through (UE Tx) panel p=0 (different/independent from that applied to ({p=0, SRI=0} and/or {p=0, SRI=1} and) {p=0, SRI=2} above).

When transmitting an SRS corresponding to {p=1, SRI=4}, the UE may initiate SRS transmission through an SRI=4 resource to which a specific UL beam is applied through (UE Tx) panel p=1.

When transmitting an SRS corresponding to {p=1, SRI=5}, the UE may initiate SRS transmission through an SRI=5 resource to which a specific UL beam is applied through (UE Tx) panel p=1 (different/independent from that applied to {p=1, SRI=4} above).

Additionally, when the UE receives a separate base station signaling/indication to alter/change/update the panel of (all) SRS resources with p=1 among the configured SRS resources to p=0, the corresponding UE may be configured to automatically change/update the (beams applied to) SRIs 4, 5, 6, 7 corresponding to p=1 to (beams applied to) SRIs that fit p=0.

[Proposal 1-1]

In the present disclosure, as a detailed operation for the method, a scheme of changing/updating at once (that is, simultaneously) using an SRI value as a representative value which has been configured in specific UL resources (e.g., PUCCH resources) with the highest frequency among the SRI values corresponding to p=0 is proposed.

Hereinafter, as a specific embodiment of the scheme, panel-related information and/or beam-related information (e.g., spatial relation, etc.) configured in PUCCH resource(s) will be described as an example. The corresponding scheme may also be extended and applied to panel-related information regarding other specific UL channels/signals and/or operations relating to specific necessary information configuration/indication/update such as beam-related information.

Example 1

Table 10 below exemplifies the configuration of the panel-related information and beam-related information for each PUCCH resource.

TABLE 10

PUCCH resource group #1

PUCCH resource #1 (p = 0, SRI = 0)
PUCCH resource #2 (p = 0, SRI = 1)
PUCCH resource #3 (p = 0, SRI = 2)
PUCCH resource #4 (p = 0, SRI = 3)
PUCCH resource #5 (p = 0, SRI = 3)

TABLE 10-continued

PUCCH resource group #2

PUCCH resource #6 (p = 1, SRI = 4)
PUCCH resource #7 (p = 1, SRI = 5)
PUCCH resource #8 (p = 1, SRI = 6)
PUCCH resource #9 (p = 1, SRI = 7)
... (omitted) ...

In Table 10, when the UE receives an instruction to change/update (all of) panels of PUCCH resources with specific p=1 among the PUCCH resources configured by the base station to p=0, PUCCH resource group #2 may be changed/updated as shown in Table 11 below.

TABLE 11

PUCCH resource group #2

(Updated as below, by the proposed method)

PUCCH resource #6 (p = 0, SRI = 3)
PUCCH resource #7 (p = 0, SRI = 3)
PUCCH resource #8 (p = 0, SRI = 3)
PUCCH resource #9 (p = 0, SRI = 3)

The reason this operation is applied is that the configured frequency of SRI=3 is the highest in PUCCH resource group #1. In other words, assuming that the SRI=3 value is a representative value, the SRI value for the PUCCH resource group #2 may be changed/updated. When there is not one but two or more values showing the highest frequency as described above (e.g., a situation in which SRI=3 and SRI=2 show a tie frequency, etc.), there is a specific rule that may be applied, and a method of sequentially applying the same may also be considered. As an example, there exists a rule to apply the second, third, and/or more specific rule(s) (e.g., following the lowest (or highest) index, e.g., in this case, when the rule to apply "lowest-indexed SRI" is defined/configured, SRI=2 is determined by applying the above example), and the corresponding rule(s) may be configured to be applied sequentially.

The operation has the following advantages and effects.

There is an advantage that the overhead of indication/signaling (from a base station) related to a panel update "to change/update (all of) a specific p=1 part to p=0" may be greatly reduced. As an example, configuration information of multiple resources (PUCCH resources #6, 7, 8, 9) may be changed at once as above through a single control signaling message.

In addition, the UE panel may be adaptively controlled to a channel condition. As described above, the control signaling to change p=1 to p=0 may be transmitted based on the signal quality related to a change target panel. When an environment in which expected signal quality overall deteriorates during transmission from UE panel p=1 is sensed (e.g., by DL/UL beam management procedures and/or gNB's reception/measurements of UL signals), there is an effect that the base station can control to actually turn off (deactivate) the UE panel p=1 by transmitting the control signaling.

As in the aforementioned methods, the base station may transmit an independent control message (with a beam indication) to switch (e.g., fall-back) p=1 to p=0 (in unison) to the UE (through DCI and/or MAC-CE, etc.). In this connection, as in the above example, specific (default and/or fallback) beam-related information (e.g., spatial relation) to be applied to a plurality of PUCCH resources belonging to a specific UL resource (e.g., the PUCCH resource group #2) changed to p=0 may be required. The specific (default and/or fallback) beam-related information (e.g., spatial relation) may be provided (determined) based on specific predefined/pre-configured rule(s) to be automatically determined by the proposed operation as described above.

[Proposal 1-2]

In the above example, the panel before change/update (e.g., p=1, etc.) may be processed/defined/set as a "secondary panel." In this connection, as described above, the operation of "switching (fall-backing) p=1 to p=0 (in unison)" may be defined/configured as a timer-based "panel deactivation" operation (timer-based panel deactivation).

In relation to the timer-based panel deactivation operation, when (UL) transmission based on the specific panel (e.g., secondary panel, p=1) is not initiated/scheduled/indicated after a certain amount of time has elapsed, an operation of automatically switching (fall-backing) p=1 to p=0 (in unison) may be defined/configured/applied by a specific conditional operation. In other words, based on a preset/defined timer, when the condition of the corresponding timer is satisfied, the aforementioned method of changing/updating panel related information may also be considered.

For example, in the proposed methods in the present disclosure described above, a specific (UE Tx(/Rx)) panel(s) (e.g.: p=0) may be defined/configured in the form such as a "primary panel," and other specific (UE Tx(/Rx)) panel(s) (e.g.: p=1, 2, ...) may be defined/configured in the form such as "secondary panel."

In addition, when the panel fallback operation based on a specific timer is applied (e.g., fallback to p=0), the beam-related information to be applied (e.g.: spatial relation, etc.) may be applied together with the SRI-based example operation. In other words, the timer-based operation proposed in proposal 1-2 may be applied in combination with the method of changing/updating panel-related information described in proposal 1 and/or proposal 1-1 described above.

In addition, when the base station newly turns on (activates) the specific "secondary panel" (e.g.: p=1) from an off state (i.e., "panel activation" timer-based operation), beam-related information to be applied (e.g.: spatial relation) may be configured/indicated/delivered together with a specific message (via higher layer signaling (e.g.: L3 and/or L2) and/or dynamic signaling (e.g.: L1 signaling)) that is turned on (activated).

In terms of implementation, operations (e.g.: operations related to transmission of uplink signals based on at least one of proposals 1/1-1/1-2) of the base station/UE according to the aforementioned embodiments may be processed by the device of FIGS. 18 to 22 (e.g.: processors 102 and 202 of FIG. 19) to be described later.

In addition, operations (e.g.: operations related to transmission of uplink signals based on at least one of proposals 1/1-1/1-2) of the base station/UE according to the aforementioned embodiments may be stored in a memory (e.g.: 104 and 204 of FIG. 19) in the form of a command/program (e.g.: instruction, executable code) for driving at least one processor (e.g.: 102 and 202 of FIG. 19).

FIG. 15 shows an example of signaling between a UE and a base station to which the method proposed in the present disclosure may be applied. Specifically, FIG. 15 shows an example of signaling between UE (User Equipment) and BS (Base Station) for performing change/update of panel-related information to which the methods proposed in the present disclosure (e.g.: proposal 1/proposal 1-1/proposal 1-2, etc.) may be applied.

Herein, the UE/BS is only an example, and may be replaced and applied with various devices as described in FIGS. 18 to 22 to be described later. FIG. 15 is only for convenience of description, and does not limit the scope of the present disclosure. Referring to FIG. 15, it is assumed that the UE supports one or more panels, and transmission of UL channel/RS using the one or more panels may be supported. In addition, some step(s) shown in FIG. 15 may be omitted depending on circumstances and/or configurations.

UE Operation

The UE may transmit UE capability information to the BS (S1510). The UE capability information may include UE capability information related to the Panel. As an example, the UE capability information may include the number of panels (groups) that the UE may support/information on whether simultaneous transmission based on multiple panels may be performed/information on the MPUE category (e.g.: refer to MPUE category), etc. For example, the UE may transmit UE capability information related to the aforementioned proposed method (e.g.: proposal 1/proposal 1-1/proposal 1-2, etc.) to the BS.

For example, the operation of transmitting the UE capability information to the BS (100/200 in FIG. 19) by the UE (100/200 in FIG. 19) of the aforementioned S1510 may be implemented by the device of FIGS. 18 to 22 to be described below. For example, referring to FIG. 19, one or more processors 102 may control one or more transceivers 106 and/or one or more memories 104 to transmit the UE capability information, and the one or more transceivers 106 may transmit the UE capability information to the BS.

The UE may receive RRC configuration information related to a panel and/or a beam from the BS (S1520). Herein, the RRC configuration information may include configuration information related to multi-panel-based transmission/configuration information related to UL (e.g.: SRS, PUSCH, PUCCH, etc.) transmission. In addition/alternatively, the corresponding RRC configuration information may be configured in one or a plurality of configurations, and may be delivered through UE-specific RRC signaling.

For example, the RRC configuration information may include the RRC configuration described in the aforementioned proposed method (e.g.: proposal 1/proposal 1-1/proposal 1-2, etc.). As an example, for uplink resources (e.g.: PUCCH resource, SRS resource), a panel-related index (or identifier, etc.) and a beam-related index (or identifier, etc.) may be configured, respectively. In this connection, a plurality of beam-related indexes or indicators may be configured for one panel. For example, the RRC configuration information may include information on a timer related to change/update of the aforementioned panel-related information.

For example, the operation of receiving RRC configuration information related to the panel and/or beam from the BS (100/200 in FIG. 19) by the UE (100/200 in FIG. 19) of the aforementioned S1520 may be implemented by the device of FIGS. 18 to 22 to be described below. For example, referring to FIG. 19, one or more processors 102 may control one or more transceivers 106 and/or one or more memories 104 to receive the RRC configuration information related to the panel and/or beam, and the one or more transceivers 106 may receive the RRC configuration information related to the panel and/or beam from the BS.

The UE may receive information for changing/updating panel-related information from the BS (S1530). Herein, the information may be transmitted through DCI and/or MAC-CE. In addition, as an example, the panel-related information may be changed/updated independently of the beam-related information. For example, in the change/update of the panel-related information, all of the panel-related beam information may be simultaneously changed (i.e., simultaneous beam update).

For example, as described in the aforementioned proposed method (e.g.: proposal 1/proposal 1-1/proposal 1-2, etc.), the information indicating switching to the information specific panel (e.g.: switching from p=0 to p=1) may be included. In this connection, all beam-related information for the corresponding panel may be changed/updated. For example, the change of the panel-related information may be performed based on the representative SRI value as described in the aforementioned proposal 1-1. For example, the information may include information about the panel to be activated/deactivated as described in the aforementioned proposal 1-2.

For example, the operation of receiving information for changing/updating the panel-related information from the BS (100/200 in FIG. 19) by the UE (100/200 in FIG. 19) of the aforementioned S1530 may be implemented by the device of FIGS. 18 to 22 to be described below. For example, referring to FIG. 19, one or more processors 102 may control one or more transceivers 106 and/or one or more memories 104 to receive the information, and the one or more transceivers 106 may receive the information from the BS.

The UE may perform UL transmission based on the information for changing/updating panel-related information and RRC configuration information (S1540). In other words, based on the information for changing/updating panel-related information and RRC configuration information, the UE may transmit a UL channel and/or UL RS to the BS based on the configured/changed/updated panel.

For example, using the panel/beam changed/updated based on the procedure/scheme described in the aforementioned proposed method (e.g.: proposal 1/proposal 1-1/proposal 1-2, etc.), the UE may perform UL transmission (e.g.: PUCCH, PUSCH, SRS, etc.). In addition, as in the aforementioned proposal 1-2, the UE may also perform the UL transmission according to the configuration/definition based on a specific timer (e.g., through/using a panel/beam updated based on a timer).

For example, the operation of performing the UL transmission to the BS (100/200 in FIG. 19) by the UE (100/200 in FIG. 19) of the aforementioned S1540 may be implemented by the device of FIGS. 18 to 22 to be described below. For example, referring to FIG. 19, one or more processors 102 may control one or more transceivers 106 and/or one or more memories 104 to perform the UL transmission using a panel/beam changed/updated based on a procedural scheme described in the aforementioned proposed method (e.g.: proposal 1/proposal 1-1/proposal 1-2, etc.), and the one or more transceivers 106 may perform the UL transmission to the BS.

BS Operation

The BS may receive UE capability information from the UE (S1510). The UE capability information may include UE capability information related to the Panel. As an example, the UE capability information may include the number of panels (groups) that the UE may support/information on whether simultaneous transmission based on multiple panels may be performed/information on the MPUE category (e.g.: refer to MPUE category), etc. For example, the BS may receive UE capability information related to the aforementioned proposed method (e.g.: proposal 1/proposal 1-1/ proposal 1-2, etc.) from the UE.

For example, the operation of receiving the UE capability information from the UE (100/200 in FIG. 19) by the BS (100/200 in FIG. 19) of the aforementioned S1510 may be implemented by the device of FIGS. 18 to 22 to be described below. For example, referring to FIG. 19, one or more processors 102 may control one or more transceivers 206 and/or one or more memories 204 to receive the UE capability information, and the one or more transceivers 206 may receive the UE capability information from the UE.

The BS may transmit RRC configuration information related to a panel and/or a beam to the UE (S1520). Herein, the RRC configuration information may include configuration information related to multi-panel-based transmission/configuration information related to a UL (e.g.: SRS, PUSCH, PUCCH, etc.) transmission. In addition/alternatively, the corresponding RRC configuration information may be configured in one or a plurality of configurations, and may be delivered through UE-specific RRC signaling.

For example, the RRC configuration information may include the RRC configuration described in the aforementioned proposed method (e.g.: proposal 1/proposal 1-1/proposal 1-2, etc.). As an example, for uplink resources (e.g.: PUCCH resource, SRS resource), a panel-related index (or identifier, etc.) and a beam-related index (or identifier, etc.) may be configured, respectively. In this connection, a plurality of beam-related indexes or indicators may be configured for one panel. For example, the RRC configuration information may include information on a timer related to change/update of the aforementioned panel-related information.

For example, the operation of transmitting RRC configuration information related to the panel and/or beam to the UE (100/200 in FIG. 19) by the BS (100/200 in FIG. 19) of the aforementioned S1520 may be implemented by the device of FIGS. 18 to 22 to be described below. For example, referring to FIG. 19, one or more processors 202 may control one or more transceivers 206 and/or one or more memories 204 to transmit the RRC configuration information related to the panel and/or beam, and the one or more transceivers 206 may transmit the RRC configuration information related to the panel and/or beam to the UE.

The BS may transmit information for changing/updating panel-related information to the UE (S1530). Herein, the information may be transmitted through DCI and/or MAC-CE. In addition, as an example, the panel-related information may be changed/updated independently of the beam-related information. For example, in the change/update of the panel-related information, all of the panel-related beam information may be simultaneously changed (i.e., simultaneous beam update).

For example, as described in the aforementioned proposed method (e.g.: proposal 1/proposal 1-1/proposal 1-2, etc.), the information indicating switching to the information specific panel (e.g.: switching from p=0 to p=1) may be included. In this connection, all beam-related information for the corresponding panel may be changed/updated. For example, the change of the panel-related information may be performed based on the representative SRI value as described in the aforementioned proposal 1-1. For example, the information may include information about the panel to be activated/deactivated as described in the aforementioned proposal 1-2.

For example, the operation of transmitting information for changing/updating the panel-related information to the UE (100/200 in FIG. 19) by the BS (100/200 in FIG. 19) of the aforementioned S1530 may be implemented by the device of FIGS. 18 to 22 to be described below. For example, referring to FIG. 19, one or more processors 202 may control one or more transceivers 206 and/or one or more memories 204 to transmit the information, and the one or more transceivers 206 may transmit the information to the UE.

The BS may receive a UL channel and/or UL signal transmitted based on the information for changing/updating panel-related information and RRC configuration information (S1540). In other words, based on the information for changing/updating panel-related information and RRC configuration information, the UE may transmit a UL channel and/or UL RS to the BS based on the configured/changed/updated panel.

For example, using the panel/beam changed/updated based on the procedure/scheme described in the aforementioned proposed method (e.g.: proposal 1/proposal 1-1/proposal 1-2, etc.), the BS may receive the transmitted UL channel and/or UL signal (e.g.: PUCCH, PUSCH, SRS, etc.) from the UE. In addition, as in the aforementioned proposal 1-2, the BS may also receive the UL channel and/or UL signal transmitted from the UE according to the configuration/definition based on a specific timer (e.g., through/using a panel/beam updated based on a timer).

For example, the operation of receiving the UL channel and/ UL signal from the UE (100/200 in FIG. 19) by the BS (100/200 in FIG. 19) of the aforementioned S1540 may be implemented by the device of FIGS. 18 to 22 to be described below. For example, referring to FIG. 19, one or more processors 202 may control one or more transceivers 206 and/or one or more memories 204 to receive the UL channel and/or UL signal transmitted using a panel/beam changed/updated based on a procedural scheme described in the aforementioned proposed method (e.g.: proposal 1/proposal 1-1/proposal 1-2, etc.), and the one or more transceivers 206 may receive the UL channel and/or UL signal from the UE.

As mentioned above, the aforementioned BS/UE signaling and operations (e.g.: proposal 1/proposal 1-1/proposal 1-2, FIG. 15, etc.) may be implemented by the device (e.g.: FIGS. 18 to 22) to be described below. For example, the UE may correspond to a first wireless device, the BS may correspond to a second wireless device, and vice versa may also be considered in some cases.

For example, the aforementioned BS/UE signaling and operation (e.g.: proposal 1/proposal 1-1/proposal 1-2, FIG. 15, etc.) may be processed by one or more processors 102 and 202 of FIG. 19, and the aforementioned BS/UE signaling and operation (e.g.: proposal 1/proposal 1-1/proposal 1-2, FIG. 15, etc.) may be stored in a memory (e.g.: one or more memories 104 and 204 of FIG. 19) in the form of a command/program (e.g.: instruction, executable code) for driving at least one processor (e.g.: 102 and 202 of FIG. 19).

Hereinafter, the aforementioned embodiments will be described in detail with reference to FIG. 16 in terms of the operation of the UE. The methods described below are merely distinguished for convenience of explanation, and thus it is obvious that a partial configuration of any method may be replaced by or combined with a partial configuration of other methods.

FIG. 16 is a flowchart illustrating a method for transmitting an uplink signal by a UE in a wireless communication system according to an embodiment of the present disclosure.

Referring to FIG. 16, a method for transmitting an uplink signal by a UE in a wireless communication system according to an embodiment of the present disclosure may include: receiving configuration information related to transmission of the uplink signal (S1610), receiving a message indicating an update of a panel related to the uplink signal (S1620), and transmitting the uplink signal based on the configuration information and the message (S1630).

In S1610, the UE receives configuration information related to transmission of an uplink signal from a base station. The configuration information may be based on an RRC message. The configuration information may include information on at least one of a panel or a beam related to transmission of an uplink signal. The configuration information may be based on RRC configuration information related to the panel and/or beam of S1520 described above.

According to an embodiment, the configuration information may be related to at least one of spatial relation information (Spatial-Relation Info) or an uplink transmission configuration indicator state (UL Transmission Configuration Indicator state, UL TCI state). A beam related to transmission of the uplink signal may be determined based on the configuration information.

A beam and a panel for transmitting the uplink signal may be configured/determined independently. The configuration information may include information on uplink resources related to transmission of the uplink signal. At least one panel related to transmission of the uplink signal among a plurality of panels of the UE may be determined based on uplink resources through which the uplink signal is transmitted.

According to S1610 described above, the operation of receiving, by the UE (100/200 in FIGS. 18 to 22), configuration information related to transmission of an uplink signal from the base station (100/200 in FIGS. 18 to 22) may be implemented by the device of FIGS. 18 to 22. For example, referring to FIG. 19, one or more processors 102 may control one or more transceivers 106 and/or one or more memories 104 to receive configuration information related to transmission of an uplink signal from the base station 200.

In S1620, the UE receives a message indicating an update of a panel related to the uplink signal from the base station.

According to an embodiment, the message may be based on Downlink Control Information (DCI) or Medium Access Control-Control Element (MAC-CE).

According to S1620 described above, the operation of receiving, by the UE (100/200 in FIGS. 18 to 22), a message indicating an update of a panel related to the uplink signal from the base station (100/200 in FIGS. 18 to 22) may be implemented by the device of FIGS. 18 to 22. For example, referring to FIG. 19, one or more processors 102 may control one or more transceivers 106 and/or one or more memories 104 to receive a message indicating an update of a panel related to the uplink signal from the base station 200.

In S1630, the UE transmits the uplink signal based on the configuration information and the message to the base station.

According to an embodiment, the beam related to transmission of the uplink signal may be determined based on the configuration information (e.g., Spatial-relation info, UL TCI state). At least one panel related to transmission of the uplink signal among a plurality of panels of the UE may be determined based on uplink resources through which the uplink signal is transmitted. In other words, a panel and a beam for transmitting the uplink signal may be individually determined.

According to an embodiment, based on a specific panel configured to at least one specific uplink resource among the uplink resources being updated to a first panel through the message, a beam configured in the at least one specific uplink resource may be updated to a specific beam. This embodiment may be based on the proposal 1-1 above.

Taking Tables 10 and 11 above as examples, the uplink resources may be PUCCH resources #1 to #9 belonging to PUCCH resource groups #1 and #2 based on Table 10 above. The at least one specific uplink resource may be PUCCH resources #6 to #9 belonging to PUCCH resource group #2. The specific panel may be a panel in which p=1. The first panel may be a panel in which p=0.

When the message indicates to update the panel with p=1 to p=0, beams (i.e., SRI=4, 5, 6, 7) configured in the at least one specific uplink resource (PUCCH resources #6 to #9) may be updated to a specific beam (SRI=3).

According to an embodiment, the specific beam may be based on a beam most configured in uplink resources related to the first panel among the uplink resources. Taking Tables 10 and 11 above as examples, the specific beam (SRI=3) may be a beam (SRI=3) most configured among beams (SRI=0, 1, 2, 3, 3) configured in uplink resources (PUCCH resources #1 to #5) related to the first panel (p=0).

According to an embodiment, based on beams most configured in uplink resources related to the first panel being two or more (e.g.: SRI 2, SRI 3), the specific beam may be a beam determined based on at least one specific rule among the two or more beams.

A beam determined based on the at least one specific rule may be based on a beam having a specific index. For example, when the beams most configured for uplink resources related to the first panel are SRI 2 and SRI 3, the beam determined based on the at least one specific rule may be based on SRI 2 (SRI 3) having the lowest (highest) index.

According to an embodiment, the specific index may be related to an index of Spatial-Relation RS. The Spatial-Relation RS may be based on a downlink reference signal (DL RS) or an uplink reference signal (UL RS). For example, the specific index may be based on an SRS resource indicator (SRI). As another example, the specific index may be based on a CSI-RS resource indicator (CRI). As another example, the specific index may be based on an SSB resource indicator (SSBRI).

The uplink signal may be transmitted based on the determined (updated) beam/panel.

According to an embodiment, the update of the specific panel may be performed based on expiration of a preset timer. This embodiment may be based on the proposal 1-2 above.

According to an embodiment, the first panel may be based on a primary panel, and the remaining panels of the at least one panel other than the first panel may be based on a secondary panel. This embodiment may be based on the proposal 1-2 above. For example, the primary panel may be a panel in which p=0, and the secondary panel may include a panel in which p=1, 2, 3.

Based on non-initiation of transmission of the uplink signal based on the secondary panel within a time according to a preset timer, a panel configured for uplink resources related to the secondary panel among the uplink resources may be updated to the primary panel.

For example, it may be assumed that transmission of an uplink signal based on the secondary panel (e.g.: p=2) is not initiated until the elapse of time according to a preset time from a time point (a reference time point) at which an uplink resource (e.g.: PUCCH resources #4 to #9) related to the secondary panel is configured. In this connection, the panel configured in an uplink resource (e.g.: PUCCH resources #4 to #9) related to the secondary panel may be updated to the primary panel (e.g.: p=0). The reference time point is an example and may vary depending on the implementation of the UE/base station.

In other words, based on the expiration of a preset timer as described above, a panel configuration of all uplink resources related to the secondary panel may be simultaneously updated. The operation has the same effect as deactivation of the secondary panel.

According to an embodiment, at least one panel related to transmission of the uplink signal may be determined based on an uplink resource group, and the uplink resource group may include at least one uplink resource. For example, the uplink resource group may be based on a physical uplink control channel resource group (PUCCH resource group). The PUCCH resource group may include one or more PUCCH resources.

According to S1630 described above, the operation of transmitting, by the UE (100/200 in FIGS. 18 to 22), the uplink signal based on the configuration information and the message to the base station (100/200 in FIGS. 18 to 22) may be implemented by the device of FIGS. 18 to 22. For example, referring to FIG. 19, one or more processors 102 may control one or more transceivers 106 and/or one or more memories 104 to transmit the uplink signal based on the configuration information and the message to the base station 200.

Hereinafter, the aforementioned embodiments will be described in detail with reference to FIG. 17 in terms of the operation of the base station. The methods described below are merely distinguished for convenience of explanation, and thus it is obvious that a partial configuration of any method may be replaced by or combined with a partial configuration of other methods.

Referring to FIG. 17, a method for receiving an uplink signal by a base station in a wireless communication system according to an embodiment of the present disclosure may include: transmitting configuration information related to transmission of the uplink signal (S1710), transmitting a message indicating an update of a panel related to the uplink signal (S1720), and receiving the uplink signal based on the configuration information and the message (S1730).

In S1710, the base station transmits configuration information related to transmission of an uplink signal to a UE. The configuration information may be based on an RRC message. The configuration information may include information on at least one of a panel or a beam related to transmission of an uplink signal. The configuration information may be based on RRC configuration information related to the panel and/or beam of S1520 described above.

According to an embodiment, the configuration information may be related to at least one of spatial relation information (Spatial-Relation Info) or an uplink transmission configuration indicator state (UL Transmission Configuration Indicator state, UL TCI state). A beam related to transmission of the uplink signal may be determined based on the configuration information.

A beam and a panel for transmitting the uplink signal may be configured/determined independently. The configuration information may include information on uplink resources related to transmission of the uplink signal. At least one panel related to transmission of the uplink signal among a plurality of panels of the UE may be determined based on uplink resources through which the uplink signal is transmitted.

According to S1710 described above, the operation of transmitting, by the base station (100/200 in FIGS. 18 to 22), configuration information related to transmission of an uplink signal to the UE (100/200 in FIGS. 18 to 22) may be implemented by the device of FIGS. 18 to 22. For example, referring to FIG. 19, one or more processors 202 may control one or more transceivers 206 and/or one or more memories 204 to transmit configuration information related to transmission of an uplink signal to the UE 100.

In S1720, the base station transmits a message indicating an update of a panel related to the uplink signal to the UE.

According to an embodiment, the message may be based on Downlink Control Information (DCI) or Medium Access Control-Control Element (MAC-CE).

According to S1720 described above, the operation of transmitting, by the base station (100/200 in FIGS. 18 to 22), a message indicating an update of a panel related to the uplink signal to the UE (100/200 in FIGS. 18 to 22) may be implemented by the device of FIGS. 18 to 22. For example, referring to FIG. 19, one or more processors 202 may control one or more transceivers 206 and/or one or more memories 204 to transmit a message indicating an update of a panel related to the uplink signal to the UE 100.

In S1730, the base station receives the uplink signal based on the configuration information and the message from the UE.

According to an embodiment, the beam related to transmission of the uplink signal may be determined based on the configuration information (e.g., Spatial-relation info, UL TCI state). At least one panel related to transmission of the uplink signal among a plurality of panels of the UE may be determined based on uplink resources through which the uplink signal is transmitted. In other words, a panel and a beam for transmitting the uplink signal may be individually determined.

According to an embodiment, based on a specific panel configured to at least one specific uplink resource among the uplink resources being updated to a first panel through the message, a beam configured in the at least one specific uplink resource may be updated to a specific beam. This embodiment may be based on the proposal 1-1 above.

Taking Tables 10 and 11 above as examples, the uplink resources may be PUCCH resources #1 to #9 belonging to PUCCH resource groups #1 and #2 based on Table 10 above. The at least one specific uplink resource may be PUCCH resources #6 to #9 belonging to PUCCH resource group #2. The specific panel may be a panel in which p=1. The first panel may be a panel in which p=0.

When the message indicates to update the panel with p=1 to p=0, beams (i.e., SRI=4, 5, 6, 7) configured in the at least one specific uplink resource (PUCCH resources #6 to #9) may be updated to a specific beam (SRI=3).

According to an embodiment, the specific beam may be based on a beam most configured in uplink resources related to the first panel among the uplink resources. Taking Tables 10 and 11 above as examples, the specific beam (SRI=3) may be a beam (SRI=3) most configured among beams (SRI=0, 1, 2, 3, 3) configured in uplink resources (PUCCH resources #1 to #5) related to the first panel (p=0).

According to an embodiment, based on beams most configured in uplink resources related to the first panel being two or more (e.g.: SRI 2, SRI 3), the specific beam may be a beam determined based on at least one specific rule among the two or more beams.

A beam determined based on the at least one specific rule may be based on a beam having a specific index. For example, when the beams most configured for uplink resources related to the first panel are SRI 2 and SRI 3, the beam determined based on the at least one specific rule may be based on SRI 2 (SRI 3) having the lowest (highest) index.

According to an embodiment, the specific index may be related to an index of Spatial-Relation RS. The Spatial-Relation RS may be based on a downlink reference signal (DL RS) or an uplink reference signal (UL RS). For example, the specific index may be based on an SRS resource indicator (SRI). As another example, the specific index may be based on a CSI-RS resource indicator (CRI). As another example, the specific index may be based on an SSB resource indicator (SSBRI).

The uplink signal may be transmitted based on the determined (updated) beam/panel.

According to an embodiment, the update of the specific panel may be performed based on expiration of a preset timer. This embodiment may be based on the proposal 1-2 above.

According to an embodiment, the first panel may be based on a primary panel, and the remaining panels of the at least one panel other than the first panel may be based on a secondary panel. This embodiment may be based on the proposal 1-2 above. For example, the primary panel may be a panel in which p=0, and the secondary panel may include a panel in which p=1, 2, 3.

Based on non-initiation of transmission of the uplink signal based on the secondary panel within a time according to a preset timer, a panel configured for uplink resources related to the secondary panel among the uplink resources may be updated to the primary panel.

For example, it may be assumed that transmission of an uplink signal based on the secondary panel (e.g.: p=2) is not initiated until the elapse of time according to a preset time from a time point (a reference time point) at which an uplink resource (e.g.: PUCCH resources #4 to #9) related to the secondary panel is configured. In this connection, the panel configured in an uplink resource (e.g.: PUCCH resources #4 to #9) related to the secondary panel may be updated to the primary panel (e.g.: p=0). The reference time point is an example and may vary depending on the implementation of the UE/base station.

In other words, based on the expiration of a preset timer as described above, a panel configuration of all uplink resources related to the secondary panel may be simultaneously updated. The operation has the same effect as deactivation of the secondary panel.

According to an embodiment, at least one panel related to transmission of the uplink signal may be determined based on an uplink resource group, and the uplink resource group may include at least one uplink resource. For example, the uplink resource group may be based on a physical uplink control channel resource group (PUCCH resource group). The PUCCH resource group may include one or more PUCCH resources.

According to S1730 described above, the operation of receiving, by the base station (100/200 in FIGS. 18 to 22), the uplink signal based on the configuration information and the message from the UE (100/200 in FIGS. 18 to 22) may be implemented by the device of FIGS. 18 to 22. For example, referring to FIG. 19, one or more processors 202 may control one or more transceivers 206 and/or one or more memories 204 to receive the uplink signal based on the configuration information and the message from the UE 100.

Example of Communication System Applied to Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 18 illustrates a communication system 1 applied to the present disclosure.

Referring to FIG. 18, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Device Applied to the Present Disclosure

FIG. 19 illustrates wireless devices applicable to the present disclosure.

Referring to FIG. 19, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of Signal Processing Circuit Applied to the Present Disclosure

FIG. 20 illustrates a signal process circuit for a transmission signal.

Referring to FIG. 20, a signal processing circuit 1000 may include scramblers 1010, modulators 1020, a layer mapper 1030, a precoder 1040, resource mappers 1050, and signal generators 1060. An operation/function of FIG. 20 may be performed, without being limited to, the processors 102 and 202 and/or the transceivers 106 and 206 of FIG. 19. Hardware elements of FIG. 20 may be implemented by the processors 102 and 202 and/or the transceivers 106 and 206 of FIG. 19. For example, blocks 1010 to 1060 may be implemented by the processors 102 and 202 of FIG. 19. Alternatively, the blocks 1010 to 1050 may be implemented by the processors 102 and 202 of FIG. 19 and the block 1060 may be implemented by the transceivers 106 and 206 of FIG. 19.

Codewords may be converted into radio signals via the signal processing circuit 1000 of FIG. 20. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 20. For example, the wireless devices (e.g., 100 and 200 of FIG. 19) may receive radio signals from the exterior through the antenna ports/transceivers. The received radio signals may be converted into baseband signals through signal restorers.

To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of Wireless Device Applied to the Present Disclosure

FIG. 21 illustrates another example of a wireless device applied to the present disclosure.

The wireless device may be implemented in various forms according to a use-case/service (refer to FIG. 18). Referring to FIG. 21, wireless devices 100 and 200 may correspond to the wireless devices 100 and 200 of FIG. 19 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 18), the vehicles (100b-1 and 100b-2 of FIG. 18), the XR device (100c of FIG. 18), the hand-held device (100d of FIG. 18), the home appliance (100e of FIG. 18), the IoT device (100f of FIG. 18), a digital broadcast terminal, a hologram device, a public safety device, an MTC device, a medicine device, a fintech device (or a finance device), a security device, a climate/environment device, the AI server/device (400 of FIG. 18), the BSs (200 of FIG. 18), a network node, etc. The wireless device may be used in a mobile or fixed place according to a use-example/service.

In FIG. 21, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of Hand-Held Device Applied to the Present Disclosure

FIG. 22 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 22, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 21, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Hereinafter, the effects of a method for transmitting and receiving an uplink signal in a wireless communication system and a device thereof according to an embodiment of the present disclosure will be described as follows.

According to an embodiment of the present disclosure, a panel related to transmission of an uplink signal is updated based on a message related to an update of a panel. Specifically, based on a specific panel configured to at least one specific uplink resource among the uplink resources being updated to a first panel through the message, a beam configured in the at least one specific uplink resource is updated to a specific beam. The specific beam may be based on a beam most configured in uplink resources related to the first panel among the uplink resources.

Based on a panel update, since the beams configured for all uplink resources associated therewith are updated together, signaling overhead can be reduced.

In addition, a UE panel may be adaptively controlled to a channel condition related to a panel. As a specific example, when a base station senses an environment in which the expected signal quality from the specific panel is deteriorated, the specific panel may be excluded from a configuration related to uplink transmission of a UE by transmitting the message. In other words, it is possible to obtain the same effect as substantially deactivating the corresponding panel through the message transmission.

In addition, the aforementioned operation can effectively support a system in which the panel and the beam of a UE are each independently controlled, in such a way that a panel for UL transmission of a multi-panel UE is determined by a UL resource group, and a beam for UL transmission is determined by a UL TCI state.

Here, the wireless communication technology implemented in the wireless device (eg, 100/200 of FIG. 19) of the present specification may include LTE, NR, and 6G as well as the narrowband Internet of Things for low-power communication. At this time, for example, NB-IoT technology may be an example of LPWAN (Low Power Wide Area Network) technology, and may be implemented in standards such as LTE Cat NB1 and/or LTE Cat NB2, and is limited to the above-mentioned names. no. Additionally or alternatively, the wireless communication technology implemented in the wireless device of the present specification (eg, 100/200 in FIG. 19) may perform communication based on the LTE-M technology. In this case, as an example, the LTE-M technology may be an example of an LPWAN technology, and may be called by various names such as enhanced machine type communication (eMTC). For example, LTE-M technology is 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) may be implemented in at least one of various standards such as LTE M, and is not limited to the above-described name. Additionally or alternatively, the wireless communication technology implemented in the wireless device (eg, 100/200 in FIG. 19) of the present specification is ZigBee, Bluetooth, and Low Power Wide Area Network in consideration of low power communication. LPWAN) may include at least one of, and is not limited to the above-described name. For example, the ZigBee technology can create PAN (personal area networks) related to small/low-power digital communication based on various standards such as IEEE 802.15.4, and can be called by various names.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by subsequent amendment after the application is filed.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memories may be located at the interior or exterior of the processors and may transmit data to and receive data from the processors via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The invention claimed is:

1. A method for transmitting an uplink signal by a user equipment (UE) in a wireless communication system, the method comprising:
receiving configuration information related to transmission of the uplink signal;
receiving a message indicating an update of a panel related to the uplink signal; and
transmitting the uplink signal based on the configuration information and the message,
wherein the configuration information is related to at least one of i) spatial relation information (Spatial-Relation Info) or ii) an uplink transmission configuration indicator state (UL Transmission Configuration Indicator state, UL TCI state),
wherein a beam related to the transmission of the uplink signal is determined based on the configuration information,
wherein at least one panel related to the transmission of the uplink signal among a plurality of panels of the UE is determined based on uplink resources through which the uplink signal is transmitted, and wherein, based on that a specific panel configured for at least one specific uplink resource among the uplink resources is updated to a first panel through the message, a beam configured in the at least one specific uplink resource is updated to a specific beam, wherein the specific beam is based on a beam having a highest number of times configured for uplink resources related to the first panel among the uplink resources.

2. The method of claim 1, wherein based on two or more beams having the highest number of times configured for uplink resources related to the first panel, the specific beam is a beam determined based on at least one specific rule among the two or more beams.

3. The method of claim 2, wherein the beam determined based on the at least one specific rule is based on a beam having a specific index.

4. The method of claim 3, wherein the specific index is related to an index of Spatial-Relation RS.

5. The method of claim 1, wherein the update of the specific panel is performed based on expiration of a preset timer.

6. The method of claim 1, wherein the first panel is based on a primary panel, and remaining panels other than the first panel among the at least one panel related to the transmission of the uplink signal are based on a secondary panel.

7. The method of claim 6, wherein based on non-initiation of the transmission of the uplink signal based on the secondary panel within a time according to a preset timer, a panel configured for uplink resources related to the secondary panel among the uplink resources is updated to the primary panel.

8. The method of claim 1,
wherein the at least one panel related to the transmission of the uplink signal is determined based on an uplink resource group, and
wherein the uplink resource group includes at least one uplink resource.

9. The method of claim 1, wherein the message is based on Downlink Control Information (DCI) or Medium Access Control-Control Element (MAC-CE).

10. A user equipment (UE) for transmitting an uplink signal in a wireless communication system, the UE comprising:
one or more transceivers;
one or more processors for controlling the one or more transceivers; and
one or more memories operatively connectable to the one or more processors and storing instructions for performing operations based on being executed by the one or more processors,
wherein the operations comprise:
receiving configuration information related to transmission of an uplink signal;
receiving a message indicating an update of a panel related to the uplink signal; and
transmitting the uplink signal based on the configuration information and the message, and
wherein the configuration information is related to at least one of i) spatial relation information (Spatial-Relation Info) or ii) an uplink transmission configuration indicator state (UL Transmission Configuration Indicator state, UL TCI state),
wherein a beam related to the transmission of the uplink signal is determined based on the configuration information,
wherein at least one panel related to the transmission of the uplink signal among a plurality of panels of the UE is determined based on uplink resources through which the uplink signal is transmitted, and
wherein, based on that a specific panel configured for at least one specific uplink resource among the uplink resources is updated to a first panel through the message, a beam configured in the at least one specific uplink resource is updated to a specific beam,
wherein the specific beam is based on a beam having a highest number of times configured for uplink resources related to the first panel among the uplink resources.

11. A method for receiving an uplink signal by a base station in a wireless communication system, the method comprising:
transmitting configuration information related to transmission of an uplink signal;
transmitting a message indicating an update of a panel related to the uplink signal; and
receiving the uplink signal based on the configuration information and the message,
wherein the configuration information is related to at least one of i) spatial relationship information (Spatial-Relation Info) or ii) an uplink transmission configuration indicator state (UL Transmission Configuration Indicator state, UL TCI state),
wherein a beam related to the transmission of the uplink signal is determined based on the configuration information,
wherein at least one panel related to the transmission of the uplink signal among a plurality of panels of a user equipment (UE) is determined based on uplink resources through which the uplink signal is transmitted, and
wherein, based on that a specific panel configured for at least one specific uplink resource among the uplink resources is updated to a first panel through the message, a beam configured in the at least one specific uplink resource is updated to a specific beam,
wherein the specific beam is based on a beam having a highest number of times configured for uplink resources related to the first panel among the uplink resources.

* * * * *